(12) United States Patent
Kumar et al.

(10) Patent No.: US 11,663,332 B2
(45) Date of Patent: May 30, 2023

(54) TRACKING A VIRUS FOOTPRINT IN DATA COPIES

(71) Applicant: EMC IP Holding Company LLC, Hopkinton, MA (US)

(72) Inventors: Shiv S. Kumar, Pune (IN); Jai P. Gahlot, Pune (IN); Avadut Mungre, North Goa (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 142 days.

(21) Appl. No.: 17/150,344

(22) Filed: Jan. 15, 2021

(65) Prior Publication Data

US 2022/0229905 A1 Jul. 21, 2022

(51) Int. Cl.
*G06F 21/00* (2013.01)
*G06F 21/56* (2013.01)
*G06F 11/14* (2006.01)

(52) U.S. Cl.
CPC ........ *G06F 21/565* (2013.01); *G06F 11/1464* (2013.01); *G06F 21/561* (2013.01); *G06F 21/568* (2013.01); *G06F 2201/84* (2013.01); *G06F 2221/034* (2013.01)

(58) Field of Classification Search
CPC .. G06F 21/565; G06F 11/1464; G06F 21/561; G06F 21/568; G06F 2201/84; G06F 2221/034
See application file for complete search history.

(56) References Cited

U.S. PATENT DOCUMENTS

| | | | | |
|---|---|---|---|---|
| 9,043,280 | B1* | 5/2015 | Patwardhan | G06F 11/1446 707/640 |
| 9,268,689 | B1* | 2/2016 | Chen | G06F 12/1027 |
| 10,540,164 | B2* | 1/2020 | Bafna | H04L 67/1097 |
| 10,904,292 | B1* | 1/2021 | Anderson | H04L 63/1441 |
| 2005/0262567 | A1* | 11/2005 | Carmona | G06F 21/561 713/188 |
| 2010/0154056 | A1* | 6/2010 | Smith | G06F 21/562 726/22 |
| 2016/0294847 | A1* | 10/2016 | Coronado | G06F 16/23 |
| 2020/0226256 | A1* | 7/2020 | Gaurav | G06F 16/2365 |
| 2021/0012002 | A1* | 1/2021 | Rosenthal | G06F 11/1451 |
| 2021/0075825 | A1* | 3/2021 | Davis | H04L 63/1416 |

OTHER PUBLICATIONS

Nisar et al., "A Privacy-Preserved and Cost-Efficient Control Scheme for Coronavirus Outbreak Using Call Data Record and Contact Tracing", IEEE Consumer Electronics Magazine, vol. 10, Issue: 2, Mar. 1, 2020.*

* cited by examiner

*Primary Examiner* — Morshed Mehedi
(74) *Attorney, Agent, or Firm* — Amin, Turocy & Watson, LLP

(57) ABSTRACT

Techniques are provided for tracking a virus footprint in data copies. Data copies can be made in a variety of ways, like with snapshots, backups, replications, and simple copies. As copies of files that have not been scanned since they were last modified are made, these copies can be kept track of, and associated with the original file. When the original file is later scanned and found to be clean or infected, this information can be propagated through the copies.

20 Claims, 22 Drawing Sheets

200

1300

TRACKING A VIRUS FOOTPRINT IN DATA COPIES

TECHNICAL FIELD

The present application relates generally to storing files in computer storage systems, and tracking the spread of a computer virus among those files.

BACKGROUND

Computer storage systems can provide data storage, modification and access to multiple users. This data can be represented as files in a computer file system. In some examples, a computer virus can be introduced to a storage system. A computer virus can be software that performs a malicious function against a user or administrator of the computer storage system, such as improperly accessing user logins and passwords. A computer virus can be embedded within an otherwise benign file. As a file that is infected with a virus is copied to multiple locations, such as to provide data protection, the virus itself can also be copied to multiple locations, making the virus more difficult to remove from the computer storage system.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
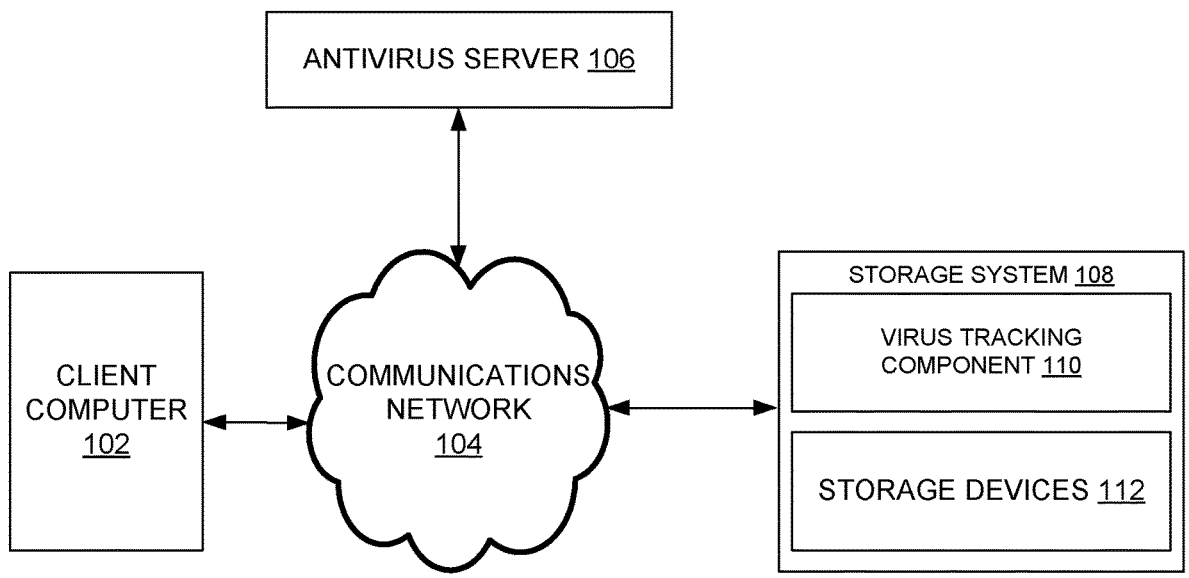
FIG. 1 illustrates an example system architecture that can facilitate tracking a virus footprint in data copies, in accordance with certain embodiments of this disclosure.

Computer storage systems (like network attached storage (NAS), direct attached storage (DAS), and storage area network (SAN) computer storage systems) can work in conjunction with antivirus servers in order to prevent virus-infected files from entering or residing in computer storage. In some examples, an antivirus server is external to a computer storage cluster that implements a computer storage system.

When an antivirus component detects and mitigates against (e.g., quarantines or deletes) a virus, the antivirus component can miss several copies of that virus that have already been made in the form of snapshots, backups, file copies, replications, etc. For example, when an infected snapshot is restored, this restore can place the virus back in the computer storage system's file system, compromising the safety of the data and computer storage system.

Scanning the snapshots themselves for viruses can be expensive in terms of processing resources, and would be done for every snapshot taken. Similar approaches to analyzing different types of data protection data can have similar problems.

A solution according to the present techniques can provide for detecting a virus footprint in data protection data without performing additional scanning.

An approach according to the present techniques can trace the copies of the virus as it spreads via data protection approaches, and take preventive measures when the presence of the virus is detected in the file system. The actions that are taken to fix the first infected occurrence of the virus can be then used to fix other infected occurrences of the virus on corresponding files. As files are scanned and infected files are found, metadata of corresponding copies (i.e., snapshots, backups, replications, and copies) can be updated. This approach can permit an administrator of a computer storage system to make an informed decision when restoring data.

As used herein, the techniques can be applied to tracking viruses in files that are protected via techniques such as snapshots, backups, replications, and file copies. Together, these techniques can generally be referred to as data protection.

A snapshot can generally comprise a stored duplicate of some amount of data (e.g., a file, a folder, or a volume) at a given point in time, and can be stored by the same storage system from which a snapshot is being taken. In some examples, a snapshot can be stored as a disk image.

A backup can generally be data stored an external system to the storage system from which a backup is taken that duplicates some amount of data at a given time. In contrast to an example where a snapshot is stored local to a storage system so the storage system can modify a snapshot's metadata directly, where a backup is stored externally, a storage system can modify a backup's metadata by sending commands to the backup system via a communications network.

A replication can generally comprise at least two storage systems, each of which store a duplicate of the data. There can be a primary replication server and at least one secondary replication server. Whereas, in some examples, a snapshot or a backup is used to restore data on a storage system that has experienced data loss or unavailability (such as because the storage system itself is down), with a replication, which replication server is primary can be switched to restore data, or continue with data availability.

A data copy can generally comprise a copy of one or more files that is made in the file system from which the source files are drawn, or to another file system. A data copy can result in there being two duplicate versions of one file, each of which can be modified by a user.

It can be appreciated that there can be examples where data protection is implemented with multiple of these techniques, such as where data is protected with both snapshots and replications. In some examples, different techniques for tracking a virus footprint in data copies based on the type of data protection that is being used.

Example Architectures and Process Flows

FIG. 1 illustrates an example system architecture 100 that can facilitate tracking a virus footprint in data copies, in accordance with certain embodiments of this disclosure.

As depicted, system architecture 100 comprises client computer 102, communications network 104, and antivirus servers 106, and storage system 108. In turn, storage system 108 comprises virus tracking component 110 and storage devices 112.

Figure 22:
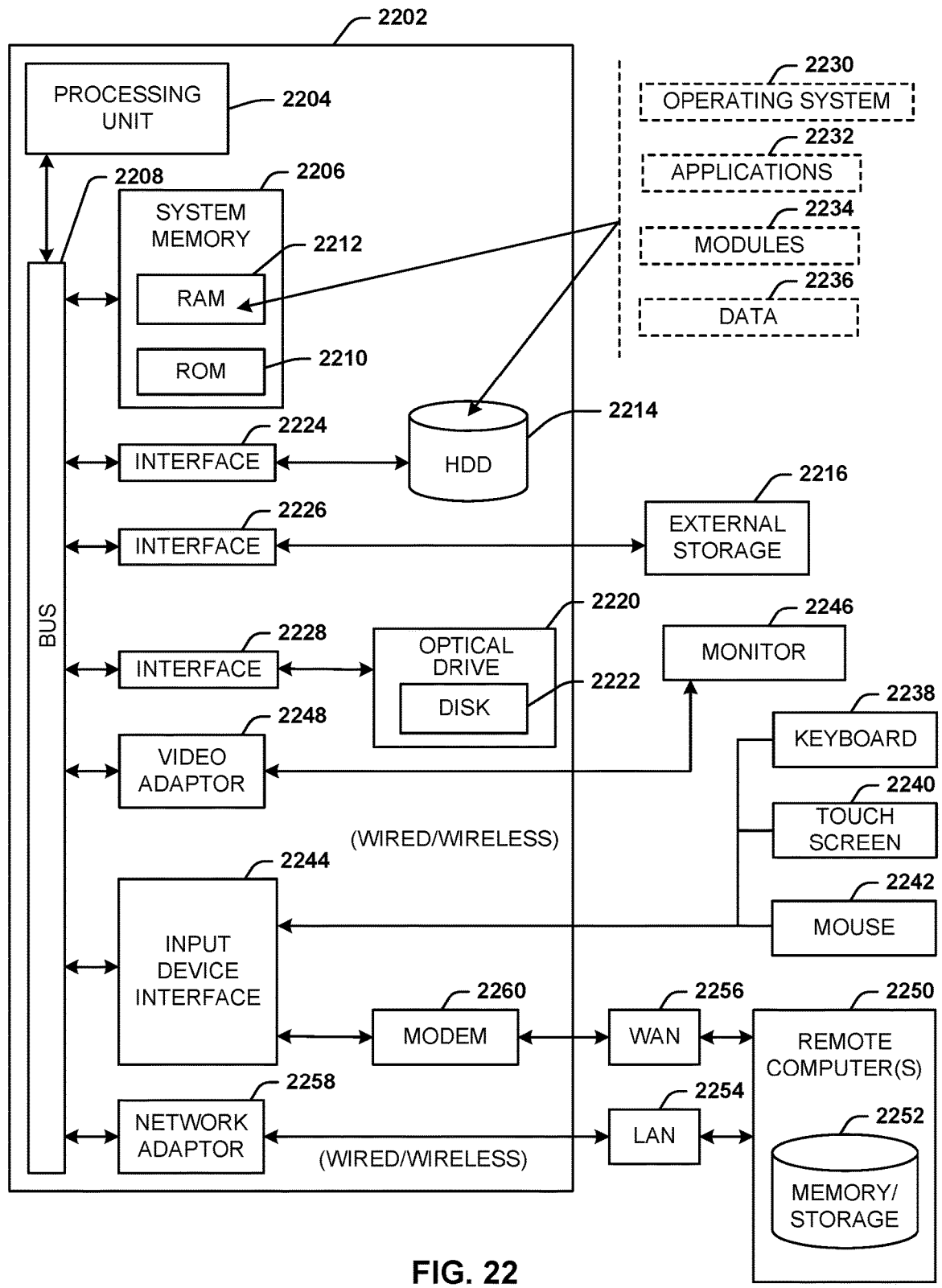
FIG. 22 illustrates an example block diagram of a computer operable to execute certain embodiments of this disclosure.

Each of client computer 102, antivirus servers 106, storage system 108, virus tracking component 110, and storage devices 112 can be implemented with one or more instances of computer 2202 of FIG. 22. In some examples, storage system 108 comprises a distributed storage system that comprises multiple instances of computer 2202 of FIG. 22. In some examples, virus tracking component 110 can be implemented with machine-executable instructions and/or aspects of computer 2202 of FIG. 22.

Communications network 104 can comprise a computer communications network, such as the INTERNET, or an isolated private computer communications network.

Client computer 102 can access storage system 108 via communications network 104. In some examples, client computer 102 can access computer storage resources provided by storage system, such as to read, write, create, or delete one or more files stored in storage devices 112.

Antivirus servers 106 can monitor storage system 108 for computer viruses, such as data stored on storage devices 112. In some examples, antivirus servers 106 are distinct from storage system 108 (e.g., as separate computer systems or separate virtual machines) to minimize a risk of the antivirus servers themselves becoming infected with a virus. When antivirus servers 106 perform antivirus activities, such as scanning files for viruses, antivirus servers 106 can relay this information to virus tracking component 110, which can use that information to facilitate tracking a virus footprint in data copies. For example, information to virus tracking component 110 can use this information to implement aspects of the process flows of FIGS. 4-8, 11, 14-17, and/or 19-21 in order to facilitate tracking a virus footprint in data copies.

As depicted, storage devices 112 are part of storage system 108, and can be used to both store files and data protection of those files (e.g., snapshots or file copies). It can be appreciated that this is a logical depiction, and there can be examples where storage devices 112 comprise multiple discrete systems, which can include an external backup system or multiple replication servers.

Figure 2:
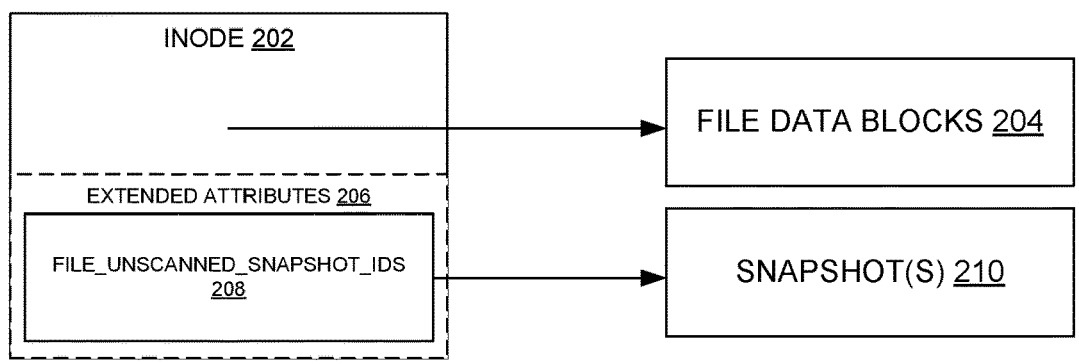
FIG. 2 illustrates an example system architecture of a data structure that can facilitate tracking a virus footprint in data copies for snapshots, in accordance with certain embodiments of this disclosure.

FIG. 2 illustrates an example system architecture 200 of a data structure that can facilitate tracking a virus footprint in data copies for snapshots, in accordance with certain embodiments of this disclosure. In some examples, virus tracking component 110 of FIG. 1 can utilize system architecture 200 to facilitate tracking a virus footprint in data copies.

System architecture 200 comprises inode 202. In turn, inode 202 contains a reference to one or more data blocks 204, and comprises extended attributes 206. As depicted, extended attributes 206 comprises extended attribute file_unscanned_snapshot_ids 208, which points to snapshot(s) 210.

Inode 202 can comprise a data structure in a file system that describes a file system object, such as a file or a directory. That file system object can be stored in one or more data blocks 204 of the file system, and inode 202 can contain an indication of which data blocks those are. Inode 202 can also store metadata about that file or directory stored in data blocks 204 in extended attributes 206.

Extended attribute file_unscanned_snapshot_ids 208 can indicate any snapshots that have stored a copy of the file (that is stored in data blocks 204) where the snapshot stored the file at a point in time where the file had not been scanned for viruses since most recently being modified or created. In some examples, a component that administers snapshots for storage system 108 can assign each snapshot of the system a unique identifier within the system (such as a number), and extended attribute file_unscanned_snapshot_ids 208 can comprise a list of these numbers for relevant snapshots, in snapshot(s) 210. In some examples, the data of snapshot(s) 210 can be stored within ("inlined into") inode 202. In other examples, the data of snapshot(s) 210 can be stored on a separate data block (that can be similar to file data blocks 204), and extended attribute file_unscanned_snapshot_ids 208 can point to that separate data block.

As described herein, one way that extended attribute file_unscanned_snapshot_ids 208 can be used is that, when the corresponding file is scanned for viruses, and a virus is found, then the snapshots that store copies of that virus can be processed for the virus. Likewise, when the file is scanned and found to be clean of viruses, then a note of that can be made for the file copies in snapshots, so that they do not need to be separately scanned for viruses, thus conserving computing resources.

It can be appreciated that in examples where data protection is implemented with multiple techniques (e.g., snapshots and backups), then extended attributes 206 can comprise more metadata for more data protection techniques. Using the example of implementing data protection with both snapshots and backups, extended attributes 206 could also comprise extended attribute unscanned_backup_ids 908 of FIG. 9, which can identify backup servers that are storing an unscanned version of the file referenced by the corresponding inode.

Similar techniques can be implemented for different combinations of data protection techniques.

Figure 3:
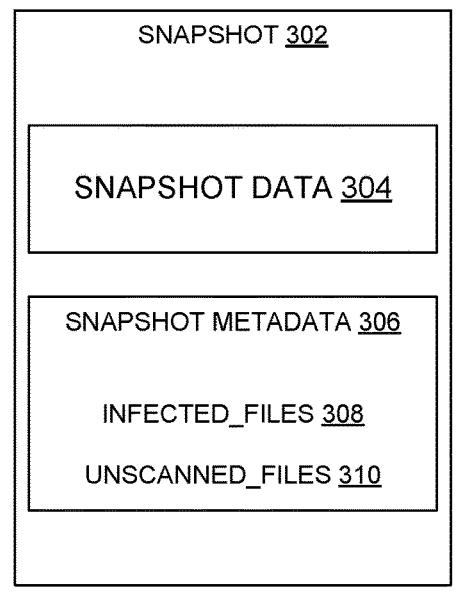
FIG. 3 illustrates an example system architecture of a snapshot that can facilitate tracking a virus footprint in data copies for snapshots, in accordance with certain embodiments of this disclosure.

FIG. 3 illustrates an example system architecture 300 of a snapshot that can facilitate tracking a virus footprint in data copies for snapshots, in accordance with certain embodiments of this disclosure. In some examples, virus tracking component 110 of FIG. 1 can utilize system architecture 300 to facilitate tracking a virus footprint in data copies.

System architecture 300 comprises snapshot 302. Snapshot 302 can be a computer data structure that comprises snapshot data 304 and corresponding snapshot metadata 306. In some examples, snapshot data 304 can comprise a disk image and one or more delta blocks that indicates changes from the disk image.

In some examples, snapshot metadata 306 can comprise infected_files 308 and unscanned_files 310. Infected_files 308 can comprise a list of files within snapshot data 304 that have been determined to be infected with a virus. Unscanned_files 310 can comprise a list of files within snapshot data 304 that have not been scanned for viruses since they were last modified or created.

In some examples where snapshot 302 is stored on a file system that utilizes inodes, snapshot metadata 306 can be implemented with extended attributes of inodes, similar to extended attributes 206 of FIG. 2.

Figure 4:
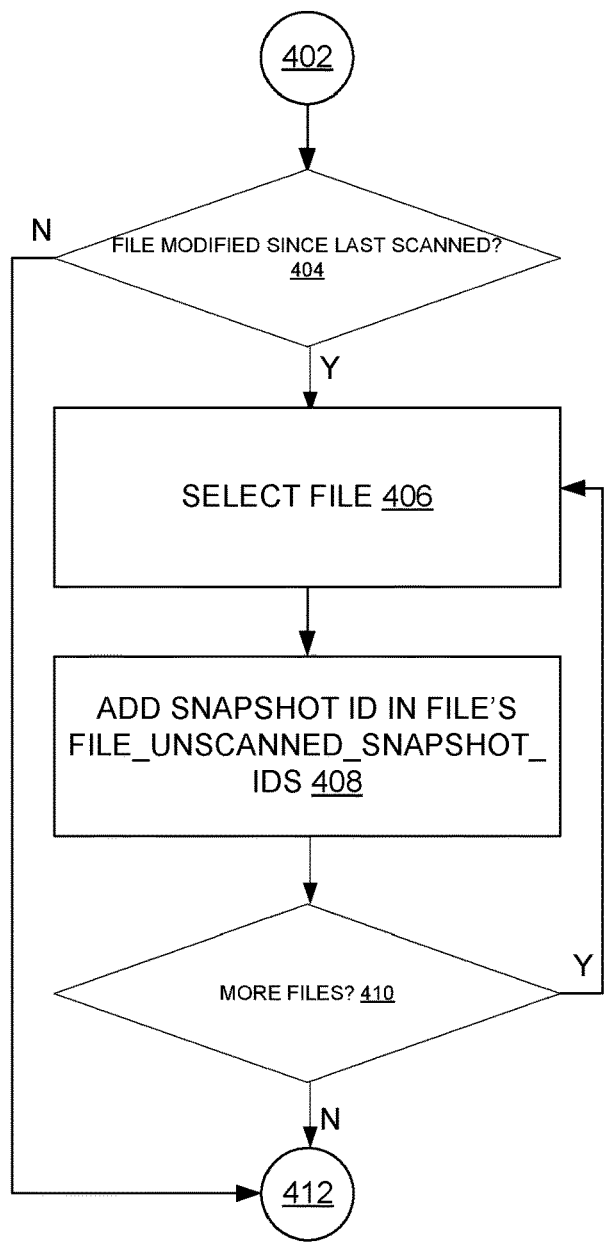
FIG. 4 illustrates an example process flow for taking a snapshot that can facilitate tracking a virus footprint in data copies, in accordance with certain embodiments of this disclosure.

FIG. 4 illustrates an example process flow 400 for taking a snapshot that can facilitate tracking a virus footprint in data copies, in accordance with certain embodiments of this disclosure. In some examples, aspects of process flow 400 can be implemented by virus tracking component 110 of FIG. 1, or computing environment 2200 of FIG. 22.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 400 begins with 402, and moves to operation 404. Operation 404 depicts determining whether there is a file that has been modified since it was last scanned. In some examples, a file system in which the files are stored (e.g., a file system on storage devices 112) can maintain metadata for a file that indicates both a time at which a file was last scanned, and a time at which the file was last modified.

Then, as a snapshot is taken for a file system or a portion of a file system (e.g., for a directory in a file system) this comparison can be made for each file. It can be determined that all files have most-recently been scanned for viruses since they were last modified, or that at least one file has been modified since it was most-recently scanned for viruses.

Where it is determined in operation 404 that there is a file that has been modified since it was last scanned, process flow 400 moves to operation 406. Instead, where it is determined in operation 404 that there is not file that has been modified since it was last scanned, process flow 400 moves to 412, where process flow 400 ends.

Operation 406 is reached from operation 404 where it is determined that there is a file that has been modified since it was last scanned, and from operation 410 where it is determined that there are more files. Operation 406 depicts selecting a file. In performing operation 404, a list of files that have been modified more recently than they were last scanned can be generated. Operation 406 can comprise selecting a first file from this list that has not yet been evaluated in the current iteration of process flow 400. After operation 406, process flow 400 moves to operation 408.

Operation 408 depicts adding a snapshot identifier to the selected file's file_unscanned_snapshot_ids. The selected file can be the file currently selected in operation 406. A snapshot can have a unique identifier within a storage system (e.g., storage system 108 of FIG. 1), and this snapshot identifier can be added to the selected file's file_unscanned_snapshot_ids, which can be similar to extended attribute file_unscanned_snapshot_ids 208 of FIG. 2. After operation 408, process flow 400 moves to operation 410.

Operation 410 depicts determining whether there are more files. In some examples, where operation 404 results in generating a list of files, operation 410 can comprise determining whether there is another file in this list of files that has not yet been evaluated in this iteration of process flow 400. Where it is determined in operation 410 that there are more files, process flow 400 returns to operation 406. Instead, where it is determined in operation 410 that there are not more files, operation 410 moves to 412, where process flow 400 ends.

A result of performing process flow 400 can be that, each file stored in the snapshot that is unscanned (i.e., has not been scanned since last modified) can have an identifier of that file stored in the snapshot's metadata. Then, when the file is scanned (such as in the file system of the storage system rather than within the snapshot itself), and determined to either be infected or clean, the snapshot's metadata can be updated to reflect this new knowledge about the file (that the data protection of the file in the snapshot is now known to be either infected or clean).

Figure 5:
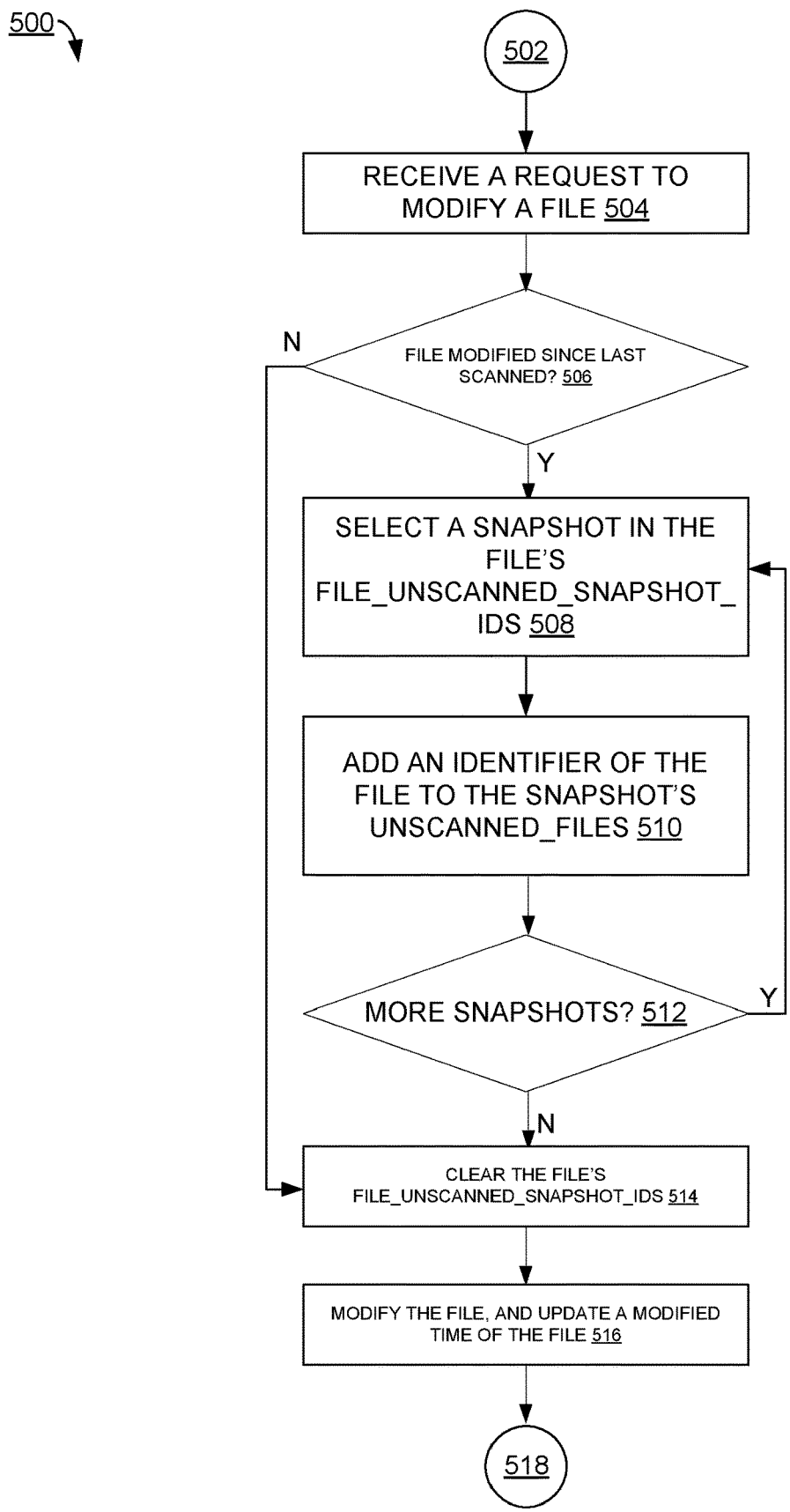
FIG. 5 illustrates an example process flow for modifying a file that is protected with a snapshot that can facilitate tracking a virus footprint in data copies, in accordance with certain embodiments of this disclosure.

FIG. 5 illustrates an example process flow 500 for modifying a file that is protected with a snapshot that can facilitate tracking a virus footprint in data copies, in accordance with certain embodiments of this disclosure. In some examples, aspects of process flow 500 can be implemented by virus tracking component 110 of FIG. 1, or computing environment 2200 of FIG. 22.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 400 of FIG. 4, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 500 begins with 502, and moves to operation 504. Operation 504 depicts receiving a request to modify a file. In some examples, this can comprise client computer 102 of FIG. 1 sending a communication to storage system 108 (that storage system 108 receives) via communications network 104 to modify a file that is stored on storage devices 112. After operation 504, process flow 500 moves to operation 506.

Operation 506 depicts determining whether the file has been modified since it was last scanned. In some examples, operation 506 can be implemented in a similar manner as operation 404 of FIG. 4, but for specifically the file referenced in operation 504 here in contrast to any files subject to a snapshot operation in operation 404.

Where it is determined in operation 506 that the file has been modified since it was last scanned, then process flow 500 moves to operation 508. Instead, where it is determined that the file has not been modified since it was last scanned, then process flow 500 moves to operation 514.

Operation 508 is reached from operation 506 where it is determined that the file has been modified since it was last scanned, and from operation 512 where it is determined that there are more snapshots. Operation 508 depicts selecting a snapshot in the file's file_unscanned_snapshot_ids. In some examples, file_unscanned_snapshot_ids can be similar to extended attribute file_unscanned_snapshot_ids 208 of FIG. 2. After operation 508, process flow 500 moves to operation 510.

Operation 510 depicts adding an identifier of the file to the snapshot's unscanned_files. In some examples, unscanned_files can be similar to unscanned_files 310 of FIG. 3. After operation 510, process flow 500 moves to operation 512.

Operation 512 depicts determining whether there are more snapshots. This can comprise determining whether there are more snapshots identified in file_unscanned_snapshot_ids (from operation 508) that have not yet been processed in this iteration of process flow 500.

Where it is determined that there are more snapshots, process flow 500 returns to operation 508. In this manner, each snapshot in the file's file_unscanned_snapshot_ids can be processed. Instead, where it is determined in operation 512 that there are not more snapshots, then process flow 500 moves to operation 514.

Operation 514 is reached from operation 506 where it is determined that the file has not been modified since it was last scanned, and from operation 512 where it is determined that there are not more snapshots. Operation 514 depicts clearing the file's file_unscanned_snapshot_ids. File_unscanned_snapshot_ids can be cleared for the file because the file is being modified, so any pre-existing duplicates of the file will no longer be duplicates once the file is modified. As such, there will be no unscanned duplicates of this now-modified file. After operation 514, process flow 500 moves to operation 516.

Operation 516 depicts modifying the file, and updating a modified time of the file. In some examples, this can comprise modifying the file as stored on storage devices 112 of FIG. 12, and updating a corresponding modification time for the file in a file system of storage devices 112. After operation 516, process flow 500 moves to operation 518, where process flow 500 ends.

A result of performing process flow 500 can be that, since an unscanned file is being modified and will be different from a version stored via data protection, that file's metadata can be cleared of identifying snapshots where duplicates of the file are stored. Still this prior version of the file contained within snapshots is still unscanned, so the snapshot itself can have its metadata modified to indicate that its version of the file is unscanned.

Figure 6:
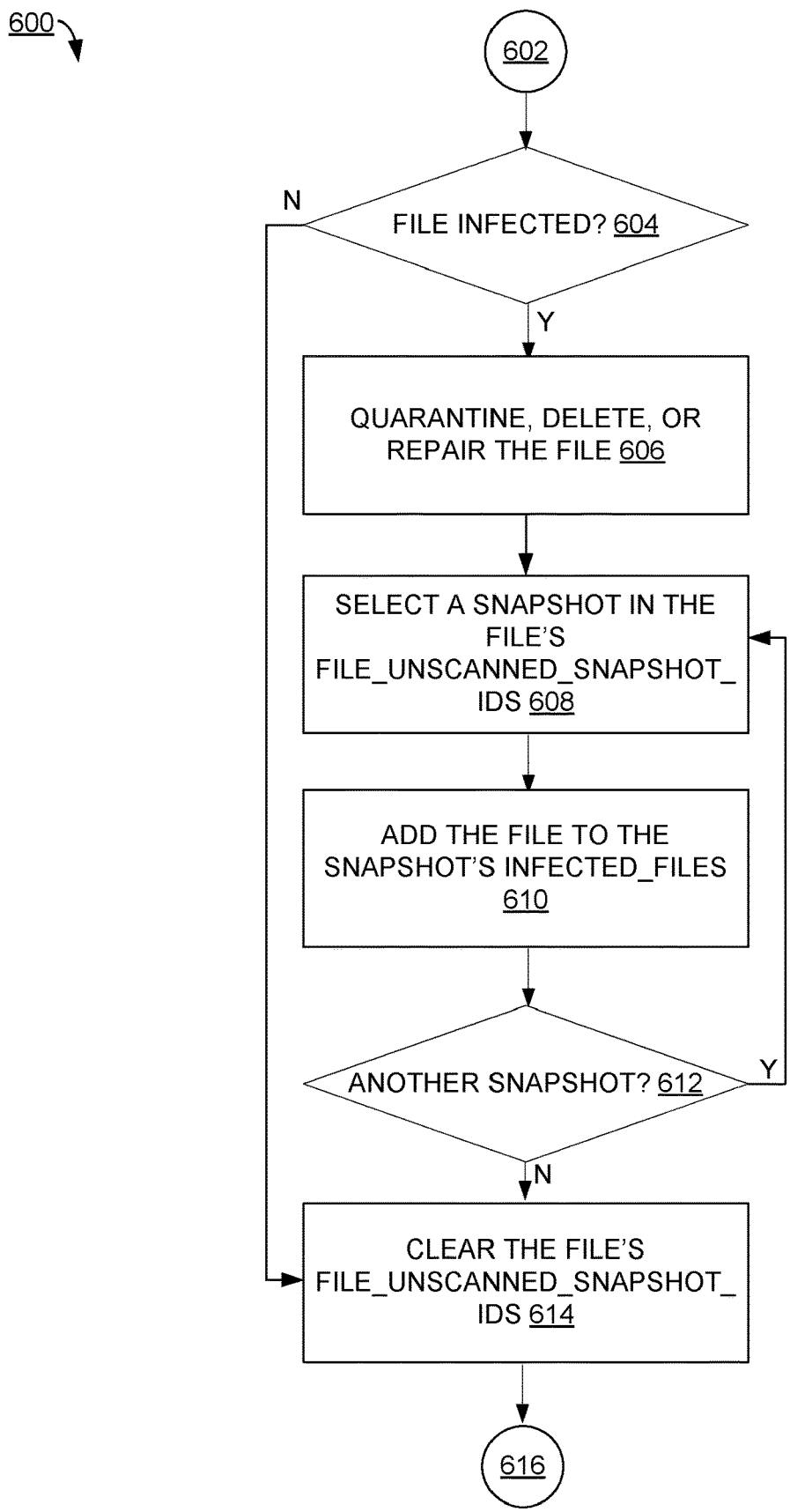
FIG. 6 illustrates an example process flow for scanning a file that is protected with a snapshot that can facilitate tracking a virus footprint in data copies, in accordance with certain embodiments of this disclosure.

FIG. 6 illustrates an example process flow 600 for scanning a file that is protected with a snapshot that can facilitate tracking a virus footprint in data copies, in accordance with certain embodiments of this disclosure. In some examples, aspects of process flow 600 can be implemented by virus tracking component 110 of FIG. 1, or computing environment 2200 of FIG. 22.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 400 of FIG. 4, process flow 500 of FIG. 5, process flow 700 of FIG. 7, process flow 800 of FIG. 8, process flow 1100 of FIG. 11, process flow 1400 of FIG. 14, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 600 begins with 602, and moves to operation 604. Operation 604 depicts determining whether a file is infected. In some examples, this comprises antivirus servers 106 of FIG. 1 analyzing a file on storage devices 112 for infection, and sending an indication to virus tracking component 110 of the result. In some examples, where a file is determined to be clean or infected, an indication of that can be stored in the file's metadata.

Where it is determined in operation 604 that a file is infected, then process flow 600 moves to operation 606. Instead, where it is determined in operation 604 that the file is not infected, then process flow 600 moves to operation 614.

Operation 606 is reached from operation 604 where it is determined that the file is infected. Operation 606 depicts quarantining, deleting, or repairing the file. Quarantining the file can comprise moving the file to a known location where it is inaccessible except by an administrator, or otherwise inhibiting access to the file. Deleting the file can comprise removing the file from the file system altogether. Repairing the file can comprise removing the virus from the file, or returning the file to a prior, known-clean state. After operation 606, process flow 600 moves to operation 608.

Operation 608 is reached from operation 606, and from operation 612 where it is determined that there is another snapshot. Operation 608 depicts selecting a snapshot in the file's file_unscanned_snapshot_ids. In some examples, operation 608 can be implemented in a similar manner as operation 508 of FIG. 5. After operation 608, process flow 600 moves to operation 610.

Operation 610 depicts adding the file to the snapshot's infected_files. In some examples, the snapshot's infected_files can be similar to infected_files 308 of FIG. 3, and a file can be added to infected_files in a similar manner as adding a file to unscanned_files in operation 510 of FIG. 5. After operation 610, process flow 600 moves to operation 612.

Operation 612 depicts determining whether there is another snapshot. In some examples, operation 612 can be implemented in a similar manner as operation 512 of FIG. 5.

Where it is determined in operation 612 that there is another snapshot, process flow 600 returns to operation 608. In this manner, each snapshot in file_unscanned_snapshot_ids can be processed in this iteration of process flow 600. Instead, where it is determined in operation 612 that there is not another snapshot, process flow 600 moves to operation 614.

Operation 614 is reached from operation 604 where it is determined that the file is not infected, and from operation 612 where it is determined that there is not another snapshot. Operation 614 depicts clearing the file's file_unscanned_snapshot_ids. In some examples, operation 614 can be implemented in a similar manner as operation 514 of FIG. 5.

In the case where the file was scanned and found to be clear, file_unscanned_snapshot_ids can be cleared because the duplicates of the file in those snapshots can also be considered to be scanned and found to be clear. In the case where the file was scanned and found to be infected, file_unscanned_snapshot_ids can be cleared because the file has still been scanned (i.e., it is no longer unscanned), and an indication of the file being infected is now stored in metadata of each snapshot that stores a duplicate of the file. Additionally, in examples where an infected file can be quarantined, deleted, or repaired, it can be that the file is now modified and the snapshots no longer contain a duplicate of the current version of the file (or lack thereof, where the file is deleted).

After operation 614, process flow 600 moves to 616, where process flow 600 ends.

A result of performing process flow 600 can be that, as files are scanned on storage devices 112 of FIG. 1 and switch from an unscanned state to either a clean state (which can be referred to as an uninfected state) or an infected state, this newfound knowledge of the state of the file can be propagated through to snapshots that are storing duplicates of the file.

Figure 7:
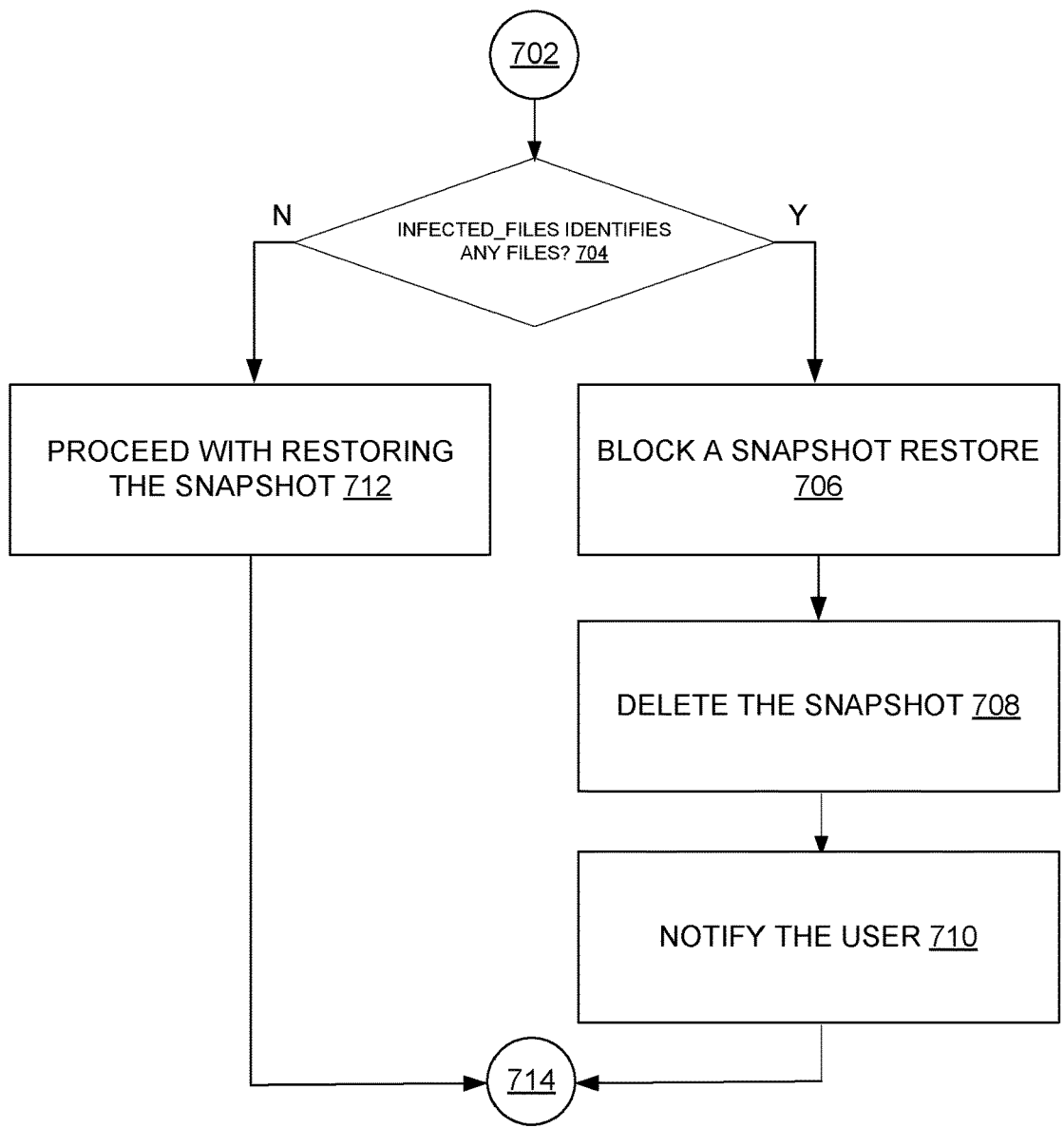
FIG. 7 illustrates an example process flow for fully restoring from a snapshot that can facilitate tracking a virus footprint in data copies, in accordance with certain embodiments of this disclosure.

FIG. 7 illustrates an example process flow 700 for fully restoring from a snapshot that can facilitate tracking a virus footprint in data copies, in accordance with certain embodiments of this disclosure. In some examples, aspects of process flow 700 can be implemented by virus tracking component 110 of FIG. 1, or computing environment 2200 of FIG. 22.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 400 of FIG. 4, process flow 500 of FIG. 5, process flow 600 of FIG. 6, process flow 800 of FIG. 8, process flow 1100 of FIG. 11, process flow 1400 of FIG. 14, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 700 begins with 702, and moves to operation 704. Operation 704 depicts determining whether infected_files identifies any files? In some examples, infected_files can be similar to infected_files 308 of FIG. 3, and determining whether infected_files identifies any files can comprise determining whether infected_files contains any entries for files, or is null. Where it is determined that infected_files identifies files, process flow 700 moves to operation 706. Instead, where it is determined that infected_files does not identify files, process flow 700 moves to operation 712.

Operation 706 is reached from operation 704 where it is determined that infected_files identifies files. Operation 706 depicts blocking a snapshot restore. That is, operation 706 can comprise sending a message to a component of storage system 108 of FIG. 1 that manages snapshots to halt restoring this snapshot to storage system 108. After operation 706, process flow 700 moves to operation 708.

Operation 708 depicts deleting the snapshot. This can comprise sending a message to a component of storage system 108 of FIG. 1 that manages snapshots to delete the snapshot. After operation 708, process flow 700 moves to operation 710.

Operation 710 depicts notifying the user. This can comprise presenting an indication that the snapshot was found to be infected, that the snapshot was not restored, and that the snapshot was deleted to a user interface accessible to an administrator of storage system 108. The user can be a user account. After operation 710, process flow 700 moves to 714, where process flow 700 ends.

Operation 712 is reached from operation 704 where it is determined that infected_files does not identify any files. Operation 712 depicts proceeding with restoring the snapshot. This can comprise virus tracking component 110 of FIG. 1 permitting the snapshot component to proceed with the snapshot restoration. After operation 712, process flow 700 moves to operation 714, where process flow 700 ends.

A result of performing process flow 700 can be that, where a snapshot is known to have an infected file, because a file from which a snapshot was taken has become known to be infected, that snapshot can be discarded. A reason for waiting to analyze the snapshot until the time of restoration can be that the data in the snapshot data will not be accessed before that time, so any virus contained in the snapshot will not cause harm to storage system 108.

Figure 8:
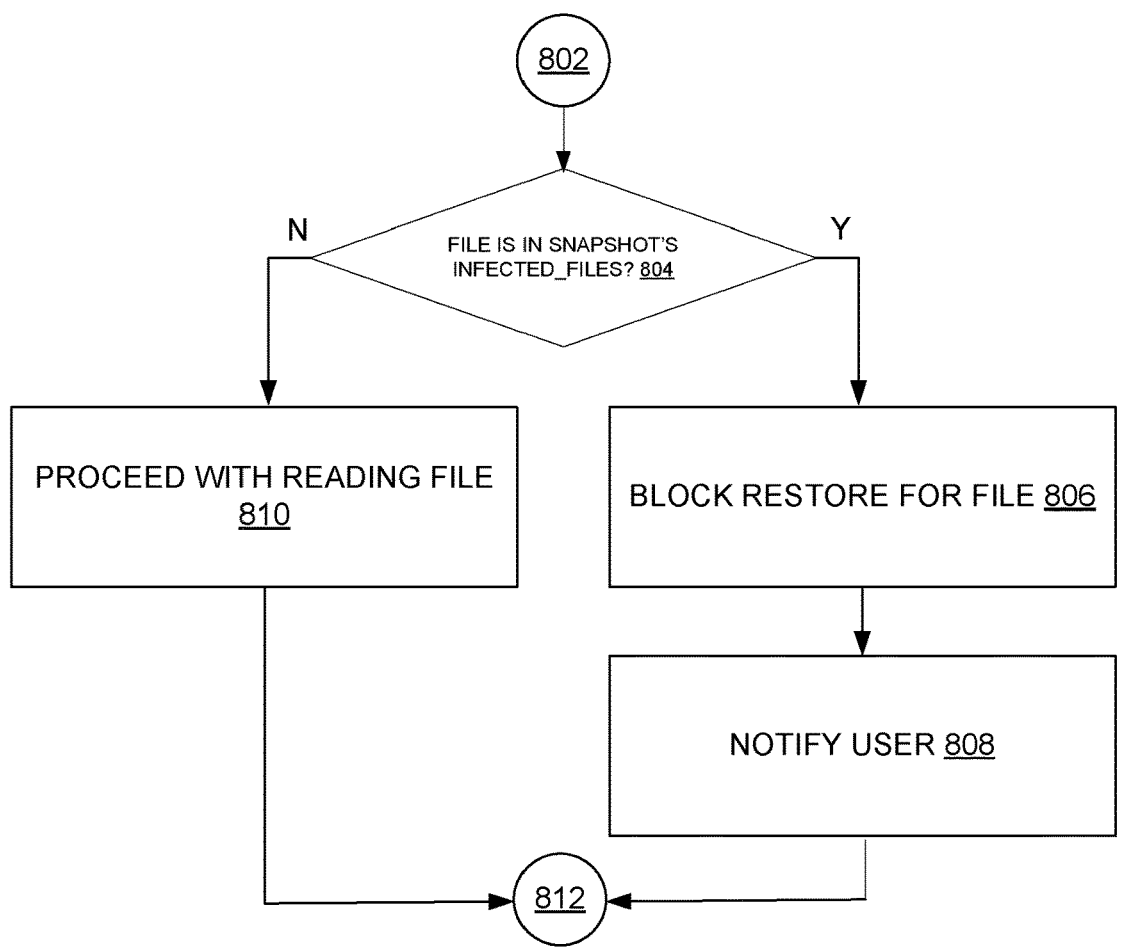
FIG. 8 illustrates an example process flow for partially restoring from a snapshot that can facilitate tracking a virus footprint in data copies, in accordance with certain embodiments of this disclosure.

FIG. 8 illustrates an example process flow 800 for partially restoring from a snapshot that can facilitate tracking a virus footprint in data copies, in accordance with certain embodiments of this disclosure. In some examples, aspects of process flow 800 can be implemented by virus tracking component 110 of FIG. 1, or computing environment 2200 of FIG. 22.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 400 of FIG. 4, process flow 500 of FIG. 5, process flow 600 of FIG. 6, process flow 700 of FIG. 7, process flow 1100 of FIG. 11, process flow 1400 of FIG. 14, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 800 begins with 802, and moves to operation 804. Operation 804 depicts determining whether a file is in the snapshot's infected_files. In some examples, infected_files can be similar to infected_files 308 of FIG. 3, and operation 804 can comprise comparing the file against those files that are listed in infected_files to see if there is a match.

While the example of process flow 800 discusses restoring one file, it can be appreciated that similar techniques can be applied to a partial snapshot restoration that encompasses multiple files (though is still less than a full restoration).

A difference between a partial restoration in process flow 800 and a full restoration in process flow 700 of FIG. 7 can be that, a partial restoration can be carried out where the snapshot has infected files, so long as those infected files are not subject of the partial restoration. So, specific files of the snapshot are analyzed to see if they are known to be infected. In contrast, in some examples, a full restoration is blocked where any file of the snapshot is known to be infected.

Where it is determined in operation 804 that the file is in the snapshot's infected_files, process flow 800 moves to operation 806. Instead, where it is determined in operation 804 that the file is not in the snapshot's infected_files, process flow 800 moves to operation 810.

Operation 806 is reached from operation 804 where it is determined that the file is in the snapshot's infected_files. Operation 806 depicts blocking restore for the file. In some examples, operation 806 can be implemented in a similar manner as operation 706 of FIG. 7, but for a file rather than an entire snapshot.

In some examples, the infected snapshot is not deleted. This can be expressed as, preserving the data protection location in storage. After operation 806, process flow 800 moves to operation 808.

Operation 808 depicts notifying a user. In some examples, operation 808 can be implemented in a similar manner as operation 710 of FIG. 7, but to notify the user that the restoration of the file was blocked (and not to inform the user that the snapshot was deleted, where that did not occur). After operation 808, process flow 800 moves to 812, where process flow 800 ends.

Operation 810 is reached from operation 804 where it is determined that the file is not in the snapshot's infected_files. Operation 810 depicts proceeding with reading the file. This can comprise reading the file from the snapshot, and storing it in another location storage devices 112 of FIG. 1 where it is accessible to a user to be read and/or modified. After operation 810, process flow 800 moves to 812, where process flow 800 ends.

Figure 9:
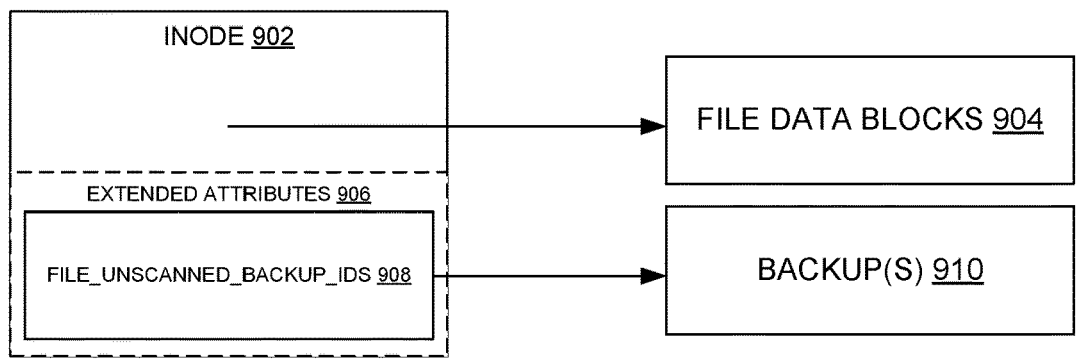
FIG. 9 illustrates an example system architecture of a data structure that can facilitate tracking a virus footprint in data copies for backups, in accordance with certain embodiments of this disclosure.

FIG. 9 illustrates an example system architecture of a data structure that can facilitate tracking a virus footprint in data copies for backups, in accordance with certain embodiments of this disclosure. In some examples, virus tracking component 110 of FIG. 1 can utilize system architecture 900 to facilitate tracking a virus footprint in data copies.

System architecture 900 comprises inode 902. In turn, inode 902 contains a reference to one or more data blocks 904, and comprises extended attributes 906. As depicted, extended attributes 906 comprises extended attribute file_unscanned_backup_ids 908, which points to backup(s) 910.

In some examples, inode 902 can be similar to inode 202 of FIG. 2, data blocks 904 can be similar to data blocks 204, and extended attributes 906 can be similar to extended attributes 206.

Extended attribute file_unscanned_backup_ids 908 can identify one or more backup locations in which backups of the file are stored (where the file was not in a scanned state—i.e., scanned since created or last modified—when it was backed up). In some examples, backup(s) 910 can identify one or more domain names or Internet Protocol (IP) addresses of a backup server to which the backup of the file was made when the file was unscanned.

Figure 10:
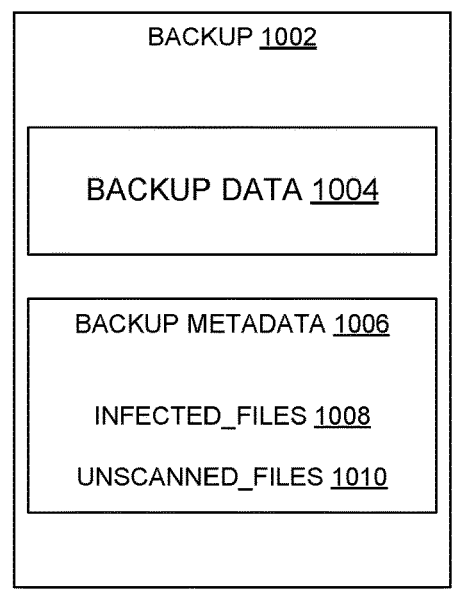
FIG. 10 illustrates an example system architecture of a backup that can facilitate tracking a virus footprint in data copies for backups, in accordance with certain embodiments of this disclosure.

FIG. 10 illustrates an example system architecture of a backup that can facilitate tracking a virus footprint in data copies for backups, in accordance with certain embodiments of this disclosure. In some examples, virus tracking component 110 of FIG. 1 can utilize system architecture 1000 to facilitate tracking a virus footprint in data copies.

System architecture 1000 comprises backup 1002. Backup 1002 can be a computer system (such as implemented with aspects of computing environment 2200 of FIG. 22) that stores a backup of one or more files of storage system 108, where backup 1002 is external to the storage system. In some examples where a backup system is remote to a storage system, the storage system can perform operations (such as updating metadata infected_files 1008) by sending requests to the backup system to perform that information, as opposed to directly performing the operation itself (such as by updating extended attribute unscanned_backup_ids 908 for an inode that is stored within the storage system).

Backup 1002 comprises backup data 1004 and corresponding backup metadata 1006. In some examples, backup data 1004 can comprise a file system that stores files, similar to that of some examples of storage system 108 of FIG. 1.

In some examples, backup metadata 1006 can comprise infected_files 1008 (which can be similar to infected_files 308 of FIG. 3) and unscanned_files 1010 (which can be similar to unscanned_files 310 of FIG. 3). Infected_files 1008 can comprise a list of files within backup data 1004 that have been determined to be infected with a virus. Unscanned_files 1010 can comprise a list of files within backup data 1004 that have not been scanned for viruses since they were last modified or created.

In some examples where backup 1002 comprises a file system that utilizes inodes, backup metadata 1006 can be implemented with extended attributes of inodes, similar to extended attributes 206 of FIG. 2.

Figure 11:
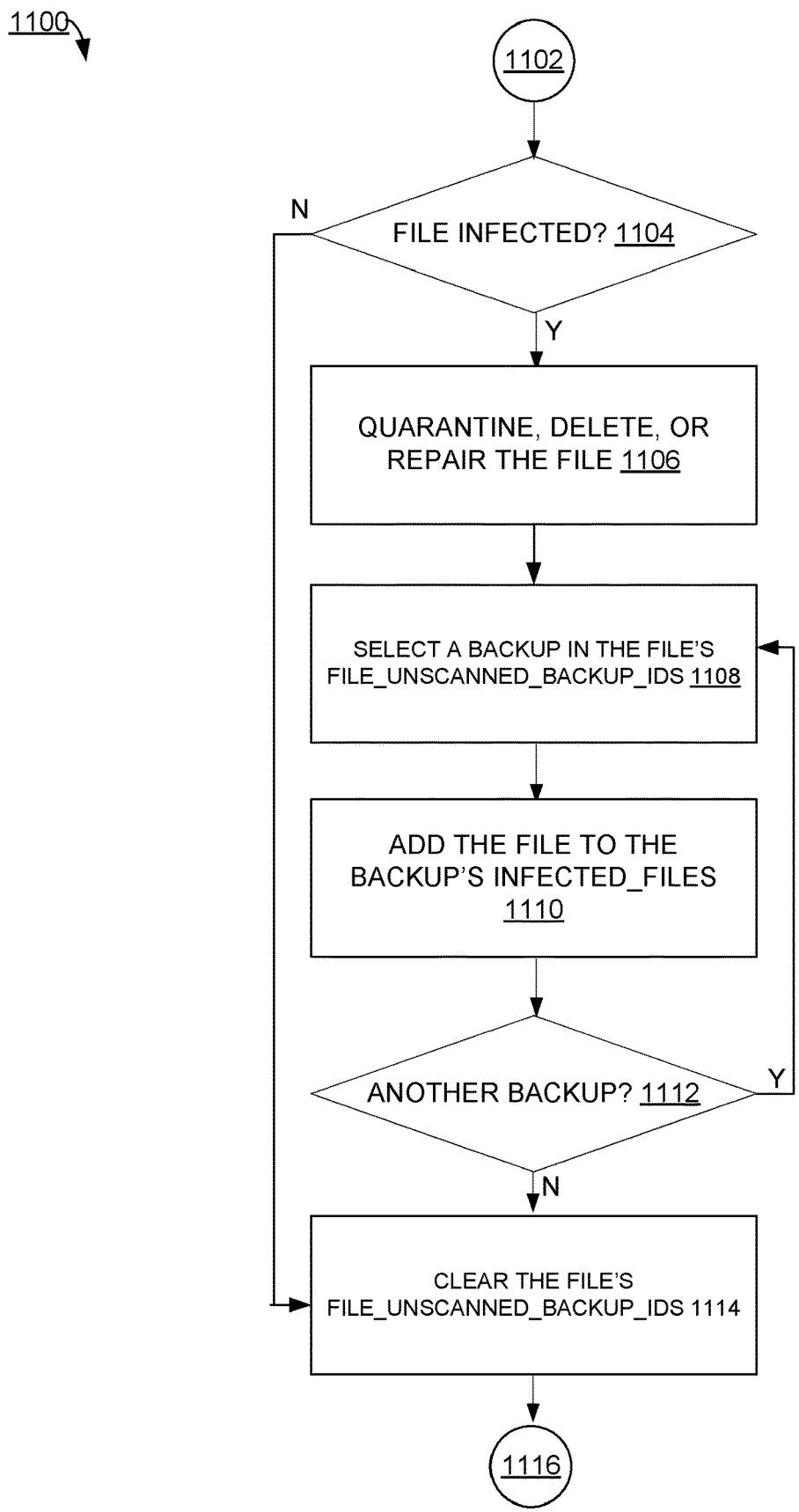
FIG. 11 illustrates an example process flow for scanning a file that is protected with a backup that can facilitate tracking a virus footprint in data copies, in accordance with certain embodiments of this disclosure.

FIG. 11 illustrates an example process flow for scanning a file that is protected with a backup that can facilitate tracking a virus footprint in data copies, in accordance with certain embodiments of this disclosure. In some examples, aspects of process flow 1100 can be implemented by virus tracking component 110 of FIG. 1, or computing environment 2200 of FIG. 22.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1400 of FIG. 14, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 1100 begins with 1102, and moves to operation 1104. Operation 1104 depicts determining whether a file is infected. In some examples, operation 1104 can be implemented in a similar manner as operation 604 of FIG. 6.

Where it is determined in operation 1104 that a file is infected, then process flow 1100 moves to operation 1106. Instead, where it is determined in operation 1104 that the file is not infected, then process flow 1100 moves to operation 1114.

Operation 1106 is reached from operation 1104 where it is determined that the file is infected. Operation 1106 depicts quarantining, deleting, or repairing the file. In some examples, operation 1106 can be implemented in a similar manner as operation 606 of FIG. 6 After operation 1106, process flow 1100 moves to operation 1108.

Operation 1108 is reached from operation 1106, and from operation 1112 where it is determined that there is another backup. Operation 1108 depicts selecting a backup in the file's file_unscanned_backup_ids. In some examples, operation 1108 can be implemented in a similar manner as operation 508 of FIG. 5. After operation 1108, process flow 1100 moves to operation 1110.

Operation 1110 depicts adding the file to the backup's infected_files. In some examples, the backup's infected_files can be similar to infected_files 1008 of FIG. 10, and a file can be added to infected_files in a similar manner as adding a file to unscanned_files in operation 510 of FIG. 5. In some examples, operation 1110 can be implemented in a similar manner as operation 610 of FIG. 6 After operation 1110, process flow 1100 moves to operation 1112.

Operation 1112 depicts determining whether there is another backup. In some examples, operation 1112 can be implemented in a similar manner as operation 512 of FIG. 5. Where it is determined in operation 1112 that there is another backup, operation 1112 returns to operation 1108. In this manner, each backup in file_unscanned_backup_ids can be processed in this iteration of process flow 1100. Instead, where it is determined in operation 1112 that there is not another backup, process flow 1100 moves to operation 1114

Operation 1114 is reached from operation 1104 where it is determined that the file is not infected, and from operation 1112 where it is determined that there is not another backup. Operation 1114 depicts clearing the file's file_unscanned_backup_ids. In some examples, operation 1114 can be implemented in a similar manner as operation 614 of FIG. 6. After operation 1114, process flow 1100 moves to 1116, where process flow 1100 ends.

A result of performing process flow 1100 can be that, as files are scanned on storage devices 112 of FIG. 1 and switch from an unscanned state to either a clean state or an infected state, this newfound knowledge of the state of the file can be propagated through to backups that are storing duplicates of the file.

In some examples, other operations for backups can be implemented in a similar manner as for snapshots. That is, taking a backup can be performed in a similar manner as taking a snapshot in process flow 400 of FIG. 4; scanning a file that is protected with a backup can be performed in a similar manner as scanning a file that is protected with a snapshot in process flow 500 of FIG. 5; fully restoring from a backup can be performed in a similar manner as fully restoring from a snapshot in process flow 700 of FIG. 7; and partially restoring from a backup can be performed in a similar manner as partially restoring from a snapshot in process flow 800 of FIG. 8.

Figure 12:
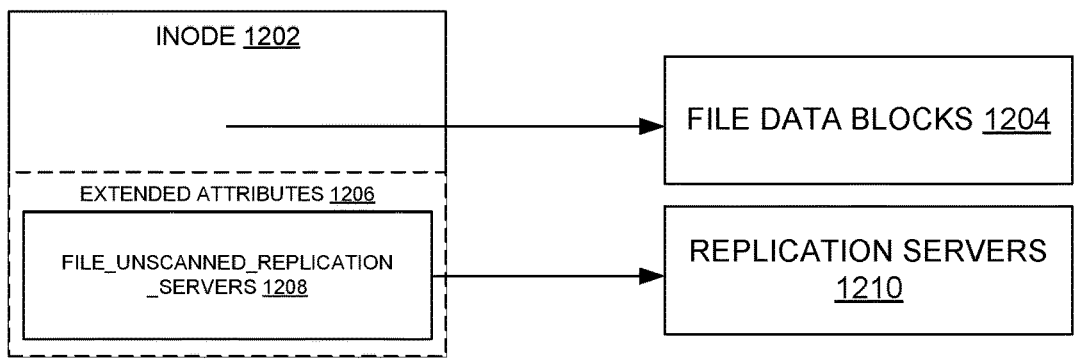
FIG. 12 illustrates an example system architecture of a data structure that can facilitate tracking a virus footprint in data copies for replications, in accordance with certain embodiments of this disclosure.

FIG. 12 illustrates an example system architecture 1200 of a data structure that can facilitate tracking a virus footprint in data copies for replications, in accordance with certain embodiments of this disclosure. In some examples, virus tracking component 110 of FIG. 1 can utilize system architecture 1200 to facilitate tracking a virus footprint in data copies.

System architecture 1200 comprises inode 1202. In turn, inode 1202 contains a reference to one or more data blocks 1204, and comprises extended attributes 1206. As depicted, extended attributes 1206 comprises extended attribute file_unscanned_replication_servers 1208, which points to replication servers 1210.

In some examples, inode 1202 can be similar to inode 202 of FIG. 2, data blocks 1204 can be similar to data blocks 204, and extended attributes 1206 can be similar to extended attributes 206.

Extended attribute file_unscanned_replication_servers 1208 can identify one or more replication servers (sometimes referred to as replication sites) in which replications of the file are stored (where the file was not in a scanned state—i.e., scanned since created or last modified—when it was replicated). In some examples, replication servers 1210 can identify one or more domain names or Internet Protocol (IP) addresses of a replication server to which the replication of the file was made when the file was unscanned.

Figure 13:
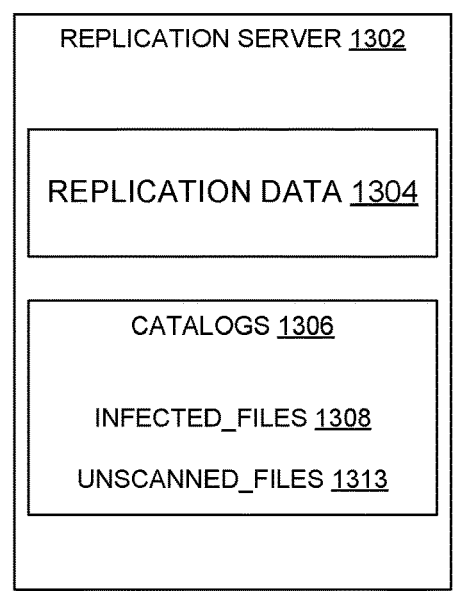
FIG. 13 illustrates an example system architecture of a replication site that can facilitate tracking a virus footprint in data copies for replications, in accordance with certain embodiments of this disclosure.

FIG. 13 illustrates an example system architecture 1300 of a replication site that can facilitate tracking a virus footprint in data copies for replications, in accordance with certain embodiments of this disclosure. In some examples, virus tracking component 110 of FIG. 1 can utilize system architecture 1300 to facilitate tracking a virus footprint in data copies.

System architecture 1300 comprises replication server 1302. Replication server 1302 can be a computer system (such as implemented with aspects of computing environment 2200 of FIG. 22) that stores a replication of one or more files of storage system 108, where replication server 1302 is external to the storage system. In some examples where a replication server is remote to a storage system, the storage system can perform operations (such as updating metadata infected_files 1308) by sending requests to the replication server to perform that information, as opposed to directly performing the operation itself (such as by updating extended attribute file_unscanned_replication_servers 1208 for an inode that is stored within the storage system).

Replication server 1302 comprises replication data 1304 and corresponding catalog 1306. In some examples, replication data 1304 can comprise a file system that stores files, similar to that of some examples of storage system 108 of FIG. 1.

In some examples, catalog 1306 can comprise infected_files 1308 (which can be similar to infected_files 308 of FIG. 3) and unscanned_files 310 (which can be similar to unscanned_files 310 of FIG. 3). Infected_files 1308 can comprise a list of files within replication data 1304 that have been determined to be infected with a virus. Unscanned_files 1310 can comprise a list of files within replication data 1304 that have not been scanned for viruses since they were last modified or created.

Figure 14:
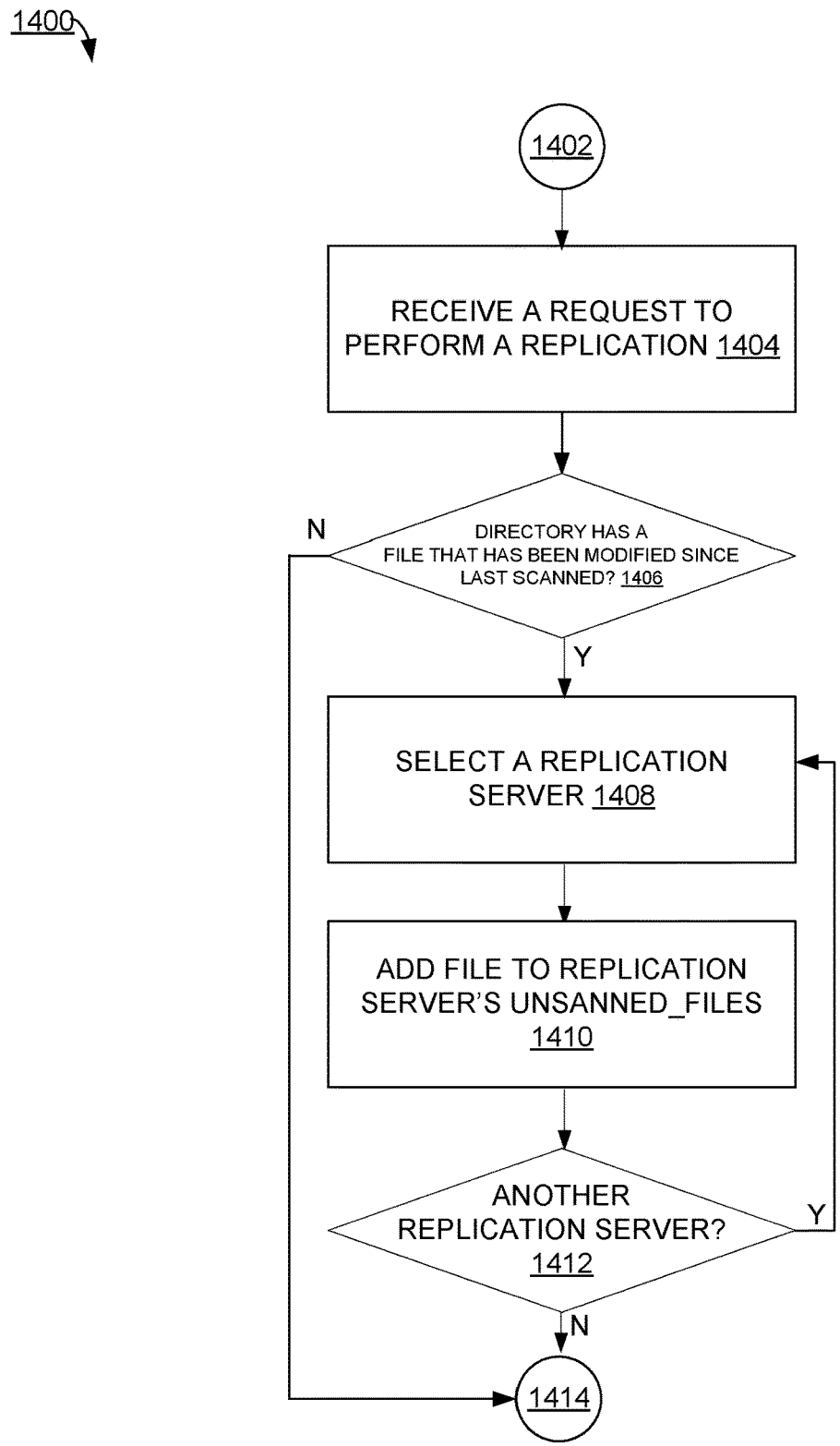
FIG. 14 illustrates an example process flow for performing a replication that can facilitate tracking a virus footprint in data copies, in accordance with certain embodiments of this disclosure.

FIG. 14 illustrates an example process flow 1400 for performing a replication that can facilitate tracking a virus footprint in data copies, in accordance with certain embodiments of this disclosure. In some examples, aspects of process flow 1400 can be implemented by virus tracking component 110 of FIG. 1, or computing environment 2200 of FIG. 22.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1500 of FIG. 15, process flow 1600 of FIG. 16, process flow 1700 of FIG. 17, process flow 1900 of FIG. 19, process flow 2000 of FIG. 20, and process flow 2100 of FIG. 21.

Process flow 1400 begins with 1402, and moves to operation 1404. Operation 1404 depicts receiving a request to perform a replication. In some examples, replications can be automatically and periodically performed, and this can comprise the expiration of a timer associated with performing a next replication. The request can identify one or more files (such as all files in a particular directory of a file system, like a file system of storage system 108 of FIG. 1), as well as a replication server to replicate data to. After operation 1404, process flow 1400 moves to operation 1406.

Operation 1406 depicts determining whether a directory has a file that has been modified since it was last scanned. In some examples, operation 1406 can be performed in a similar manner as operation 404 of FIG. 4. The directory can be a directory (including its contents) that is being replicated.

In some examples, multiple files in a directory can be modified since last scanned. In such examples, a separate instance of operations 1408-1412 can be performed for each such file.

Where it is determined in operation 1406 that the directory has a file that has been modified since it was last scanned, process flow 1400 moves to operation 1408. Instead, where it is determined in operation 1406 that the directory does not have a file that has been modified since it was last scanned, process flow 1400 moves to 1414, where process flow 1400 ends.

Operation 1408 is reached from operation 1406 where it is determined that the directory has a file that has been modified since it was last scanned, or from operation 1412 where it is determined that there is another replication server. Operation 1408 depicts selecting a replication server. In some examples, operation 1408 can be implemented in a similar manner as operation 508 of FIG. 5, and for replication servers identified in metadata file_unscanned_replication_servers (as opposed to snapshots). After operation 1408, process flow 1400 moves to operation 1410.

Operation 1410 depicts adding the file to the replication server's unscanned_files. In some examples, this can be implemented in a similar manner as operation 510 of FIG. 5. Where a replication server is remote from storage system 108 of FIG. 1 (as opposed to a snapshot, which can be stored locally), this can comprise sending a request to the replication server to add the file to the replication server's unscanned_files. After operation 1410, process flow 1400 moves to operation 1412.

Operation 1412 depicts determining whether there is another replication server. In some examples, operation 1412 can be implemented in a similar manner as operation 512 of FIG. 5, and for replication servers identified in metadata file_unscanned_replication_servers (as opposed to snapshots).

Where it is determined in operation 1412 that there is another replication server, process flow 1400 moves to operation 1408. Instead, where it is determined in operation 1406 that there is not another replication server, process flow 1400 moves to 1414, where process flow 1400 ends.

A result of performing process flow 1400 can be that, each file stored on the replication server that is unscanned (i.e., has not been scanned since last modified) can have an identifier of that file stored in the replication server's catalog. Then, when the file is scanned on the storage system, and determined to either be infected or clean, the replication server's catalog can be updated to reflect this new knowledge about the file (that the data protection of the file in the replication server is now known to be either infected or clean).

Figure 15:
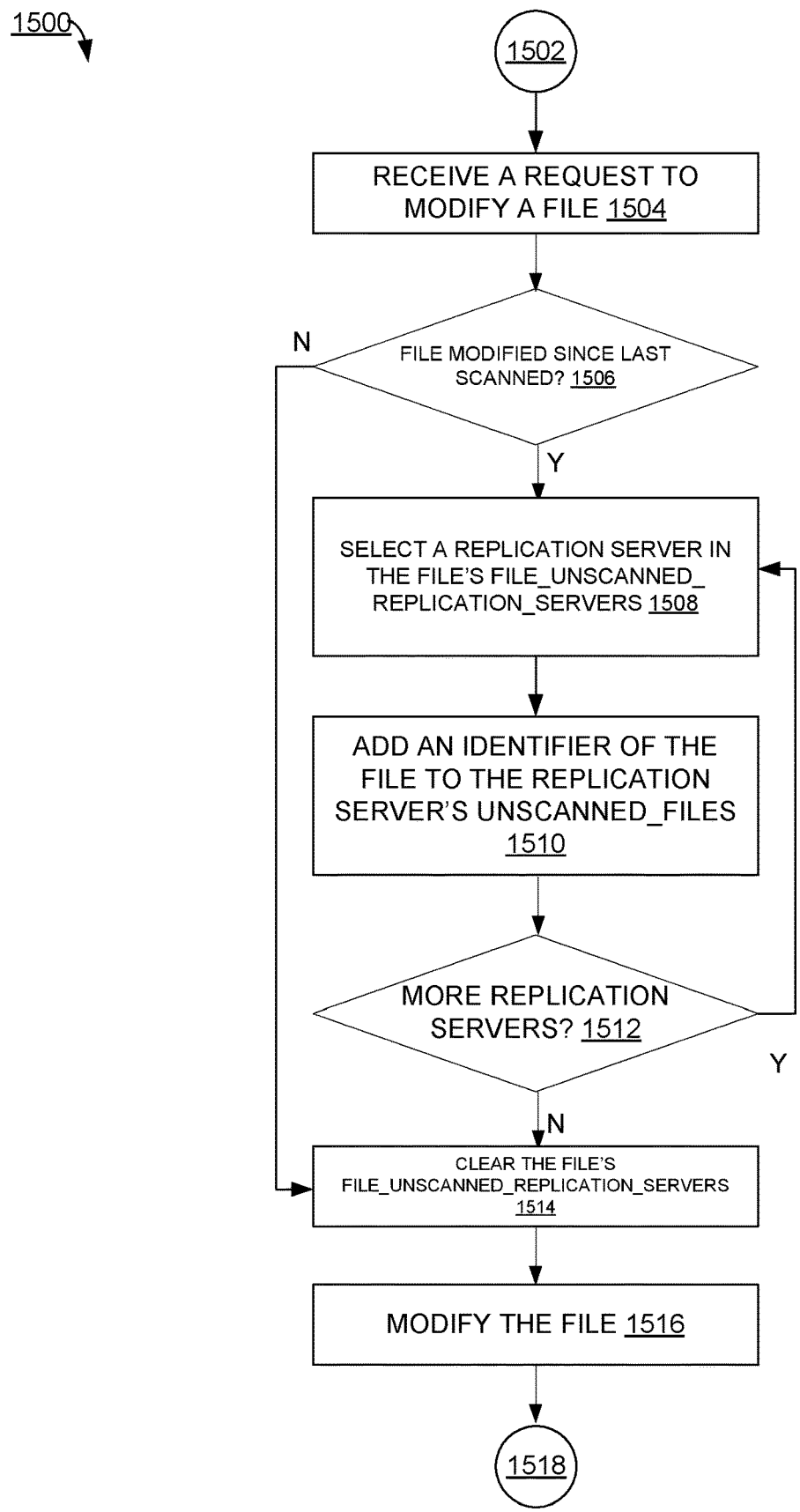
FIG. 15 illustrates an example process flow for modifying a file that is protected with a replication that can facilitate tracking a virus footprint in data copies, in accordance with certain embodiments of this disclosure.

FIG. 15 illustrates an example process flow 1500 for modifying a file that is protected with a replication that can facilitate tracking a virus footprint in data copies, in accordance with certain embodiments of this disclosure. In some examples, aspects of process flow 1500 can be implemented by virus tracking component 110 of FIG. 1, or computing environment 2200 of FIG. 22.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1600 of FIG. 16, process flow 1700 of FIG. 17, process flow 1900 of FIG. 19, process flow 2000 of FIG. 20, and process flow 2100 of FIG. 21.

Process flow 1500 begins with 1502, and moves to operation 1504. Operation 1504 depicts receiving a request to modify a file. In some examples, operation 1504 can be performed in a similar manner as operation 504 of FIG. 5. After operation 1504, process flow 1500 moves to operation 1506.

Operation 1506 depicts determining whether the file has been modified since it was last scanned. In some examples, operation 1506 can be implemented in a similar manner as operation 506 of FIG. 6. Where it is determined in operation 1506 that the file has been modified since it was last scanned, then process flow 1500 moves to operation 1508. Instead, where it is determined that the file has not been modified since it was last scanned, then process flow 1500 moves to operation 1514.

Operation 1508 is reached from operation 1506 where it is determined that the file has been modified since it was last scanned, and from operation 1512 where it is determined that there are more replication servers. Operation 1508 depicts selecting a replication server in the file's file_unscanned_replication_servers. In some examples, file_unscanned_replication_servers can be similar to extended attribute file_unscanned_replication_servers 1208 of FIG. 12. After operation 1508, process flow 1500 moves to operation 1510.

Operation 1510 depicts adding an identifier of the file to the replication server's unscanned_files. In some examples, unscanned_files can be similar to unscanned_files 1310 of FIG. 13. In some examples, this comprises sending a request to the replication server to update unscanned_files. After operation 1510, process flow 11500 moves to operation 512.

Operation 1512 depicts determining whether there are more replication servers. This can comprise determining whether there are more replication servers identified in file_unscanned_replication_servers (from operation 1508) that have not yet been processed in this iteration of process flow 1500.

Where it is determined that there are more replication servers, process flow 1500 returns to operation 1508. In this manner, each replication server in the file's file_unscanned_replication_servers can be processed. Instead, where it is determined in operation 1512 that there are not more replication servers, then process flow 1500 moves to operation 1514.

Operation 1514 is reached from operation 1506 where it is determined that the file has not been modified since it was last scanned, and from operation 1512 where it is determined that there are not more replication servers. Operation 514 depicts clearing the file's file_unscanned_replication_servers. File_unscanned_replication_servers can be cleared for the file because the file is being modified, so any pre-existing duplicates of the file will no longer be duplicates once the file is modified. As such, there will be no unscanned duplicates of this now-modified file. After operation 1514, process flow 1500 moves to operation 1516.

Operation 1516 depicts modifying the file. In some examples, this can comprise modifying the file as stored on storage devices 112 of FIG. 12. In some examples, this includes, updating a modified time of the file, such as updating a modification time for the file in a file system of storage devices 112. After operation 1516, process flow 1500 moves to operation 1518, where process flow 1500 ends.

A result of performing process flow 1500 can be that, since an unscanned file is being modified and will be different from a version stored via data protection, that file's metadata can be cleared of identifying replication servers where duplicates of the file are stored. Still this prior version of the file contained within replication servers is still unscanned, so the replication servers themselves can have their metadata modified to indicate that its version of the file is unscanned.

Figure 16:
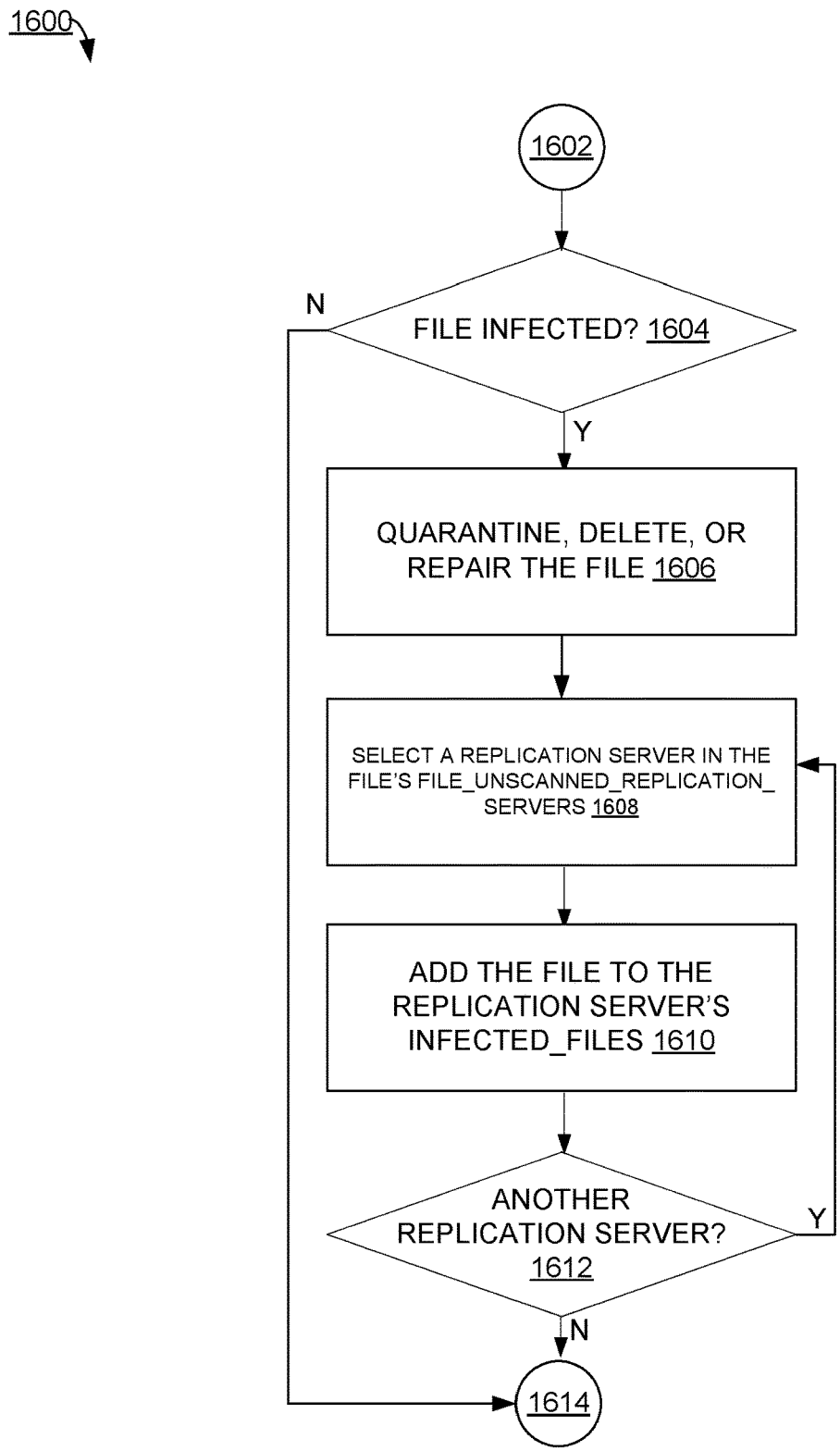
FIG. 16 illustrates an example process flow for scanning a file that is protected with a replication that can facilitate tracking a virus footprint in data copies, in accordance with certain embodiments of this disclosure.

FIG. 16 illustrates an example process flow 1600 for scanning a file that is protected with a replication that can facilitate tracking a virus footprint in data copies, in accordance with certain embodiments of this disclosure. In some examples, aspects of process flow 1600 can be implemented by virus tracking component 110 of FIG. 1, or computing environment 2200 of FIG. 22.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1700 of FIG. 17, process flow 1900 of FIG. 19, process flow 2000 of FIG. 20, and process flow 2100 of FIG. 21.

Process flow 1600 begins with 1602, and moves to operation 1604. Operation 1604 depicts determining whether a file is infected. In some examples, operation 1604 can be implemented in a similar manner as operation 604 of FIG. 6. Where it is determined in operation 1604 that a file is infected, then process flow 1600 moves to operation 1606. Instead, where it is determined in operation 1604 that the file is not infected, then process flow 1600 moves to 1614, where process flow 1600 ends.

Operation 1606 is reached from operation 1604 where it is determined that the file is infected. Operation 1606 depicts quarantining, deleting, or repairing the file. In some examples, operation 1606 can be implemented in a similar manner as operation 606 of FIG. 6. After operation 1606, process flow 1600 moves to operation 1608.

Operation 1608 is reached from operation 1606, and from operation 1612 where it is determined that there is another replication server. Operation 1608 depicts selecting a replication server in the file's file_unscanned_replication_servers. In some examples, operation 1608 can be implemented in a similar manner as operation 608 of FIG. 6. After operation 1608, process flow 1600 moves to operation 1610.

Operation 1610 depicts adding the file to the replication server's infected_files. In some examples, the replication server's infected_files can be similar to infected_files 1308 of FIG. 13, and a file can be added to infected_files in a similar manner as adding a file to unscanned_files in operation 1510 of FIG. 15. After operation 1610, process flow 1600 moves to operation 1612.

Operation 1612 depicts determining whether there is another replication server. In some examples, operation 1612 can be implemented in a similar manner as operation 1512 of FIG. 15.

Where it is determined in operation 1612 that there is another replication server, process flow 1600 returns to operation 1608. In this manner, each replication server in file_unscanned_replication_servers can be processed in this iteration of process flow 1600. Instead, where it is determined in operation 1612 that there is not another replication server, process flow 1600 moves to 1614, where process flow 1600 ends.

A result of performing process flow 1600 can be that, as files are scanned on storage devices 112 of FIG. 1 and switch from an unscanned state to either a clean state or an infected state, this newfound knowledge of the state of the file can be propagated through to replication servers that are storing duplicates of the file.

Figure 17:
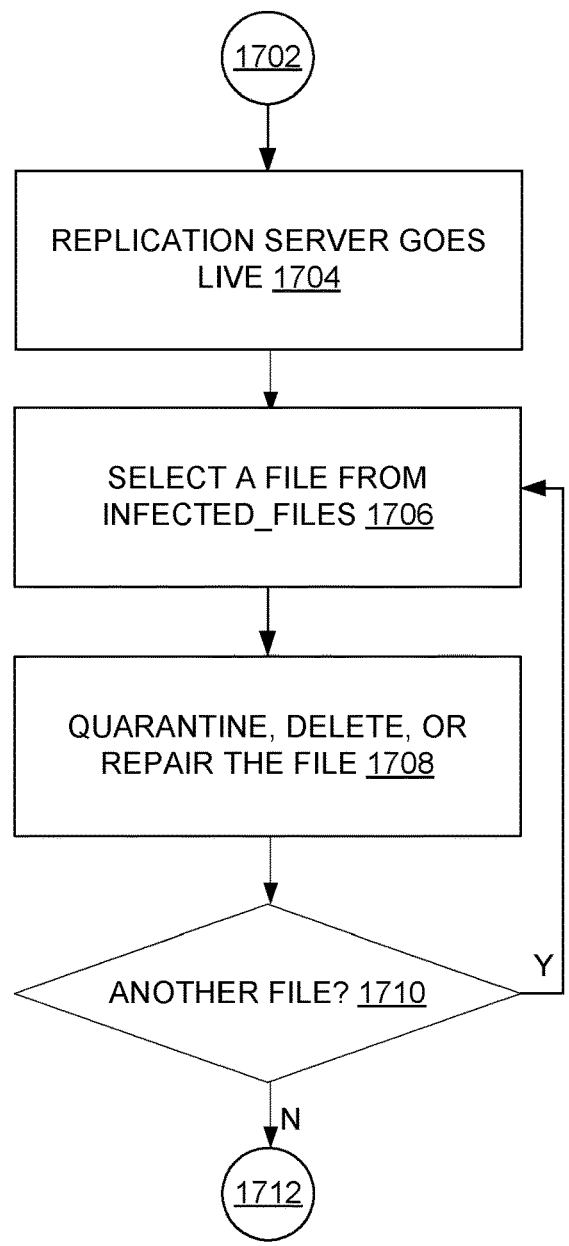
FIG. 17 illustrates an example process flow for switching between replication sites that can facilitate tracking a virus footprint in data copies, in accordance with certain embodiments of this disclosure.

FIG. 17 illustrates an example process flow 1700 for switching between replication sites that can facilitate tracking a virus footprint in data copies, in accordance with certain embodiments of this disclosure. In some examples, aspects of process flow 1700 can be implemented by virus tracking component 110 of FIG. 1, or computing environment 2200 of FIG. 22.

It can be appreciated that the operating procedures of process flow 1700 are example operating procedures, and that there can be embodiments that implement more or fewer operating procedures than are depicted, or that implement the depicted operating procedures in a different order than as depicted. In some examples, process flow 1700 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1600 of FIG. 16, process flow 1900 of FIG. 19, process flow 2000 of FIG. 20, and process flow 2100 of FIG. 21.

Process flow 1700 begins with 1702, and moves to operation 1704. Operation 1704 depicts a replication server going live. This can comprise an event where the primary replication server fails or otherwise suffers from data unavailability. In such a case, another replication server (that was functioning as the secondary replication server) can go live by becoming the primary replication server. After operation 1704, process flow 1700 moves to operation 1706.

Operation 1706 depicts selecting a file from infected_files. In some examples, this can be implemented in a similar manner as operation 1508 of FIG. 15, but for files identified in infected files, compared to replication servers identified in file_unscanned_replication_servers in operation 1508. After operation 1706, process flow 1700 moves to operation 1708.

Operation 1708 depicts quarantining, deleting, or repairing the file. In some examples, operation 1708 can be implemented in a similar manner as operation 606 of FIG. 7. After operation 1708, process flow 1700 moves to operation 1710.

Operation 1710 depicts determining whether there is another file. In some examples, operation 1710 can be implemented in a similar manner as operation 1512 of FIG. 15, but for files identified in infected files, compared to replication servers identified in file_unscanned_replication_servers in operation 1512.

Where it is determined in operation 1710 that there is another file, process flow 1700 moves to operation 1706. Instead, where it is determined in operation 1710 that there is not another file, process flow 1700 moves to 1712, where process flow 1700 ends.

A result of performing process flow 1700 can be that, before a replication server is switched to be the primary replication server, its infected files are evaluated and processed, so that known infected files are not made available by this newly-primary replication server.

Figure 18:
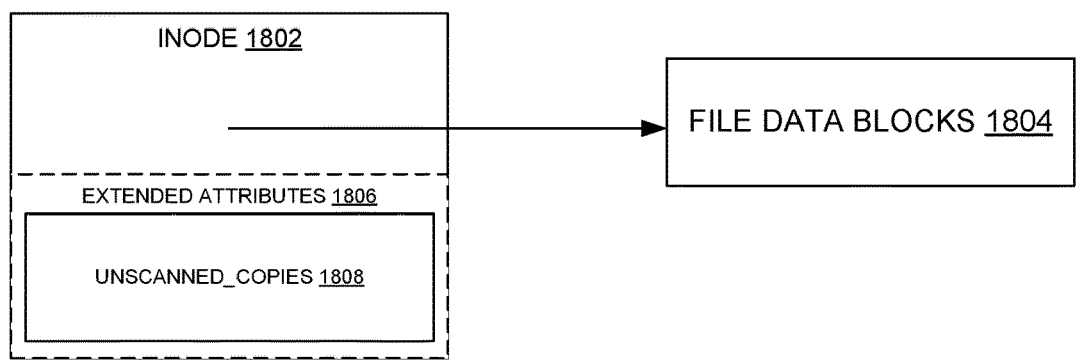
FIG. 18 illustrates an example system architecture of a data structure that can facilitate tracking a virus footprint in data copies for file copies, in accordance with certain embodiments of this disclosure.

FIG. 18 illustrates an example system architecture 1800 of a data structure that can facilitate tracking a virus footprint in data copies for file copies, in accordance with certain embodiments of this disclosure. In some examples, virus tracking component 110 of FIG. 1 can utilize system architecture 1800 to facilitate tracking a virus footprint in data copies.

System architecture 1800 comprises inode 1802. In turn, inode 1802 contains a reference to one or more data blocks 1804, and comprises extended attributes 1806. As depicted, extended attributes 1806 comprises extended attribute unscanned_copies 1808.

In some examples, inode 1802 can be similar to inode 202 of FIG. 2, data blocks 1804 can be similar to data blocks 204, and extended attributes 1806 can be similar to extended attributes 206.

Figure 19:
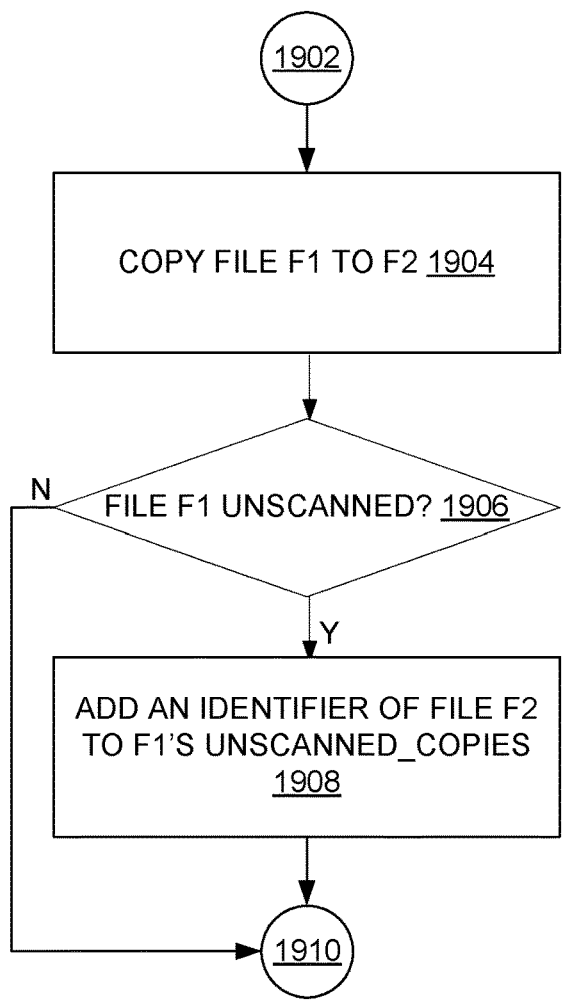
FIG. 19 illustrates an example process flow for copying a file that can facilitate tracking a virus footprint in data copies, in accordance with certain embodiments of this disclosure.

Extended attribute unscanned_copies 1808 can identify one or more file system locations in storage system 108 where a copy of the file has been made, such as with a path to the directory that stores the file and a name of the copied file. In other examples where files in a file system can be identified with an identifier that is unique within the file system (and can remain constant regardless of whether the corresponding file is moved or its name is changed), unscanned_copies 1808 can store these identifiers FIG. 19 illustrates an example process flow 1900 for copying a file that can facilitate tracking a virus footprint in data copies, in accordance with certain embodiments of this disclosure. In some examples, aspects of process flow 1900 can be implemented by virus tracking component 110 of FIG. 1, or computing environment 2200 of FIG. 22.

It can be appreciated that the operating procedures of process flow 1900 are example operating procedures, and that there can be embodiments that implement more or fewer operating procedures than are depicted, or that implement the depicted operating procedures in a different order than as depicted. In some examples, process flow 1900 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1700 of FIG. 17, process flow 1700 of FIG. 17, process flow 2000 of FIG. 20, and process flow 2100 of FIG. 21.

Process flow 1900 begins with 1902, and moves to operation 1904. Operation 1904 depicts copying a file F1 to F2. This can comprise an operating system file copy operation, such as with a cp<source file> <destination file> command in some UNIX-type operating systems. After operation 1904, process flow 1900 moves to operation 1906.

Operation 1906 depicts determining whether file F1 is unscanned since it was last modified. In some examples, operation 1906 can be implemented in a similar manner as operation 404 of FIG. 4. Where it is determined in operation 1906 that file F1 is unscanned since it was last modified, process flow 1900 moves to operation 1908. Instead, where it is determined in operation 1906 that file F1 is not unscanned since it was last modified, process flow 1900 moves to 1910, where process flow 1900 ends.

Operation 1908 is reached from operation 1906 where it is determined that the file F1 is unscanned since it was last modified. Operation 1908 depicts adding an identifier of file F2 to F1's unscanned_copies. Unscanned_copies can be similar to extended attribute unscanned_copies 1808 of FIG. 18. After operation 1908, process flow 1900 moves to 1910, where process flow 1900 ends.

A result of performing process flow 600 can be that, as files copied throughout a file system, where an unscanned file is copied, its copies can be tracked, so that when the file is later scanned, this new status of infected or cleaned can be propagated to the copies.

Figure 20:
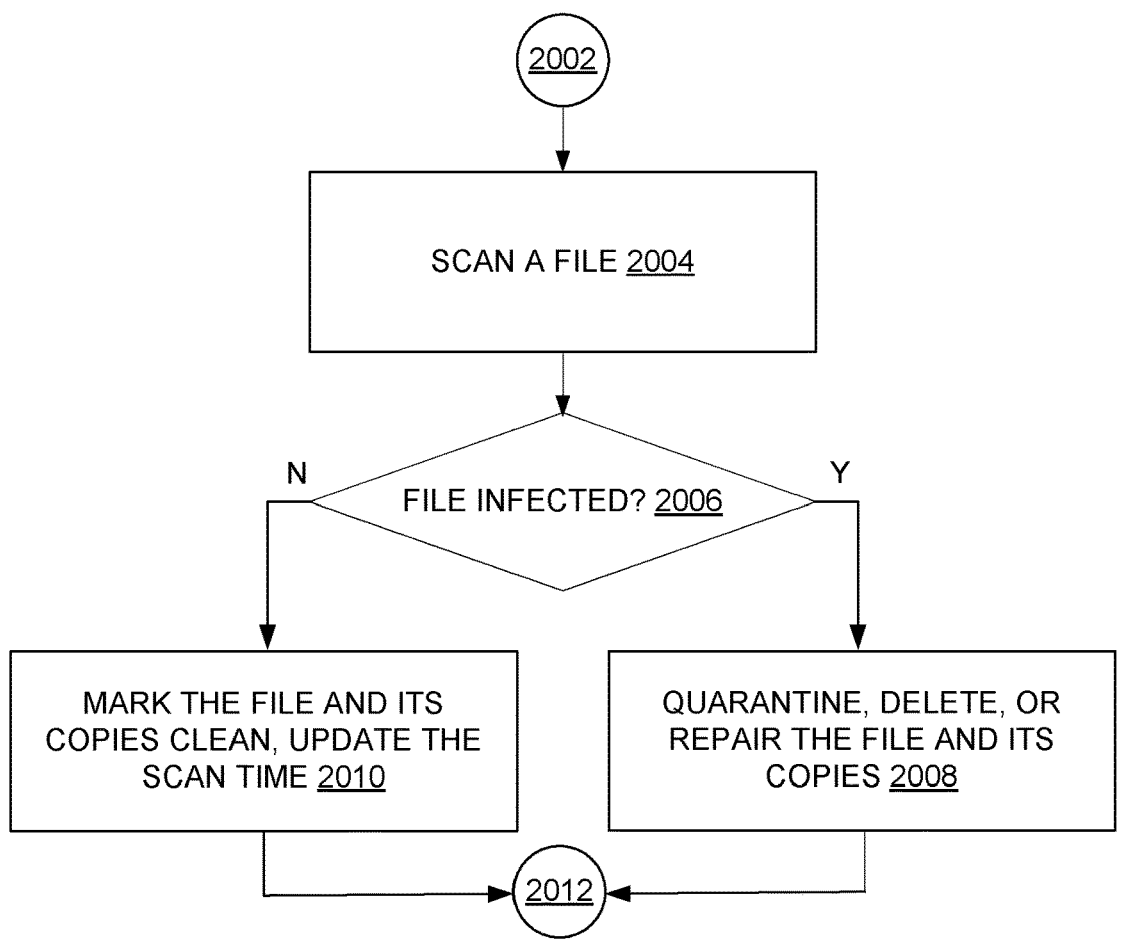
FIG. 20 illustrates an example process flow for scanning a file that is copied that can facilitate tracking a virus footprint in data copies, in accordance with certain embodiments of this disclosure.

FIG. 20 illustrates an example process flow 2000 for scanning a file that is copied that can facilitate tracking a virus footprint in data copies, in accordance with certain embodiments of this disclosure. In some examples, aspects of process flow 2000 can be implemented by virus tracking component 110 of FIG. 1, or computing environment 2200 of FIG. 22.

It can be appreciated that the operating procedures of process flow 2000 are example operating procedures, and that there can be embodiments that implement more or fewer operating procedures than are depicted, or that implement the depicted operating procedures in a different order than as depicted. In some examples, process flow 2000 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1700 of FIG. 17, process flow 1700 of FIG. 17, process flow 1900 of FIG. 19, and process flow 2100 of FIG. 21.

Process flow 2000 begins with 2002, and moves to operation 2004. Operation 2004 depicts scanning a file. In some examples, this comprises antivirus servers 106 of FIG. 1 analyzing a file on storage devices 112 for infection, and sending an indication to virus tracking component 110 of the result. After operation 2004, process flow 2000 moves to operation 2006.

Operation 2006 depicts determining whether the file is infected. In some examples, this determination can be made based upon the result of scanning the file in operation 2004. Where it is determined in operation 2006 that the file is infected, process flow 2000 moves to operation 2008. Instead, where it is determined in operation 2006 that the file is not infected, process flow 2000 moves to operation 2010.

Operation 2008 is reached from operation 2006 where it is determined that the file is infected. Operation 2008 depicts quarantining, deleting, or repairing the file and its copies. In some examples, operation 2008 can be implemented in a similar manner as operation 606 of FIG. 6.

A file's copies can be determined from unscanned_copies 1808 of FIG. 18. The files in unscanned_copies can be traversed, and each can be quarantined, deleted, or repaired. Quarantining, deleting, and repairing can be considered to be defined action to reduce the infection (or an effect) of the copy. After operation 2008, process flow 2000 moves to 2012, where process flow 2000 ends.

Operation 2010 is reached from operation 2006 where it is determined that the file is not infected. Operation 2010 depicts marking the file and its copies clean, and updating the scan time. The file's copies can be found in unscanned_copies. After operation 2010, process flow 2000 moves to 2012, where process flow 2000 ends.

A result of performing process flow 2100 can be that, as files are copied and tracked, when a file is modified, those former copies are no longer copies, so should be disregarded as copies of the now-modified file. That is, if it later turns out that the modified file is infected, this may not give an indication that any copies of the previous version of the file are infected, since the infection could have been introduced with the modification.

Figure 21:
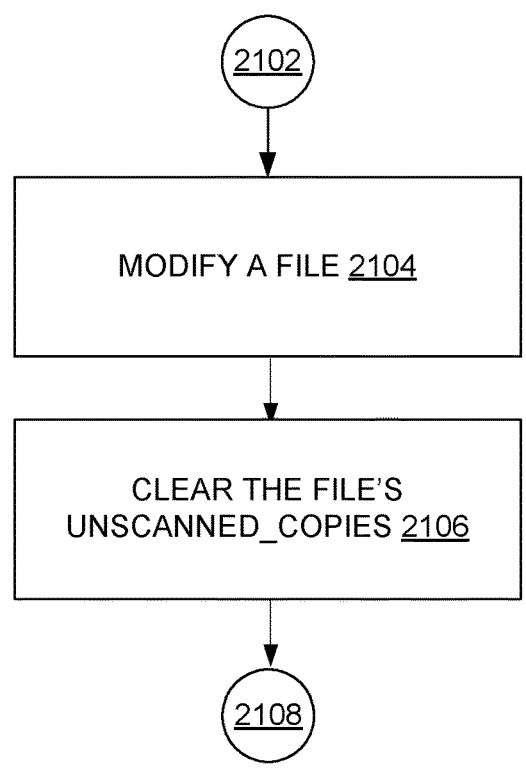
FIG. 21 illustrates an example process flow for modifying a file that is copied that can facilitate tracking a virus footprint in data copies, in accordance with certain embodiments of this disclosure.

FIG. 21 illustrates an example process flow 2100 for modifying a file that is copied that can facilitate tracking a virus footprint in data copies, in accordance with certain embodiments of this disclosure. In some examples, aspects of process flow 2100 can be implemented by virus tracking component 110 of FIG. 1, or computing environment 2200 of FIG. 22.

It can be appreciated that the operating procedures of process flow 2100 are example operating procedures, and that there can be embodiments that implement more or fewer operating procedures than are depicted, or that implement the depicted operating procedures in a different order than as depicted. In some examples, process flow 2100 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 1100 of FIG. 11, process flow 1400 of FIG. 14, process flow 1500 of FIG. 15, process flow 1700 of FIG. 17, process flow 1700 of FIG. 17, process flow 1900 of FIG. 19, and process flow 2100 of FIG. 21.

Process flow 2100 begins with 2102, and moves to operation 2104. Operation 2104 depicts modifying a file. In some examples, operation 2104 can be implemented in a similar manner as operation 1516 of FIG. 15. After operation 2104, process flow 2100 moves to operation 2106.

Operation 2106 depicts clearing the file's unscanned_copies. In some examples, this can be extended attribute unscanned_copies 1808 of FIG. 18. Clearing unscanned_copies can comprise removing any identifiers of files stored in unscanned_copies, such as an identifier of file 2 in operation 1908 of FIG. 19.

A reason for clearing unscanned_copies is, since the file is modified any previous copies of the previous version are no longer copies of the modified version. After operation 2106, process flow 2100 moves to 2108, where process flow 2100 ends.

A result of performing process flow 2100 can be that, as files are copied and tracked, when a file is modified, those former copies are no longer copies, so should be disregarded as copies of the now-modified file. That is, if it later turns out that the modified file is infected, this may not give an indication that any copies of the previous version of the file are infected, since the infection could have been introduced with the modification.

Example Operating Environment

In order to provide additional context for various embodiments described herein, FIG. 22 and the following discussion are intended to provide a brief, general description of a suitable computing environment 2200 in which the various embodiments of the embodiment described herein can be implemented.

For example, aspects of computing environment 2200 can be used to implement aspects of client computer 102, antivirus servers 106, storage system 108, virus tracking component 110, and/or storage devices 112 of FIG. 1. In some examples, computing environment 2200 can implement aspects of the process flows of FIGS. 4-8, 11, 14-17, and/or 19-21 to facilitate tracking a virus footprint in data copies.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can be enable with a security module, such as a trusted processing module (TPM). For instance, with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the Internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining that a first file is infected with a virus;
in response to the determining,
taking a defined action to reduce an effect of the virus in the first file, and
identifying a data protection location in first metadata that is stored in a first extended attribute of a first inode for the first file, wherein the first metadata identifies first data protection locations of the first file that were made subsequent to a last clean virus scan of the first file, wherein the first data protection locations comprise the data protection location, wherein the data protection location comprises a snapshot of multiple files, and wherein the first inode comprises a data structure in a file system that describes a file system object; and
in response to the identifying, storing an indication that a copy of the first file that is stored as part of the data protection location is infected in second metadata for the data protection location that is stored in a second extended attribute of a second inode of the data protection location.

2. The system of claim 1, wherein the operations further comprise:
in response to determining that a second file is not infected with any virus, clearing third metadata for the second file that identifies second data protection locations of the second file.

3. The system of claim 1, wherein the indication is a first indication, and wherein the operations further comprise:
moving a data protection of a second file to a second data protection location;
determining that the second file has been modified subsequent to a time that the second file most recently has been scanned for any virus; and
storing a second indication of the second data protection location in third metadata of the second file that identifies second data protection locations with an unscanned copy of the second file.

4. The system of claim 1, wherein the indication is a first indication wherein the data protection location is a first data protection location, and wherein the operations further comprise:
receiving a request to modify a second file;
determining that a most recent previous modification of the second file occurred after a time that the second file was last scanned for any virus;
identifying a second data protection location in third metadata for the second file that identifies data protection locations of the second file;
storing a second indication that the first file is unscanned in fourth metadata of the second data protection location; and
modifying the second file.

5. The system of claim 1, wherein the operations further comprise:
receiving a request for a full restoration from the data protection location; and
in response to determining that the second metadata indicates that the data protection location lacks an infected file, performing the full restoration from the data protection location.

6. The system of claim 1, wherein the operations further comprise:
receiving a request to for a full restoration from the data protection location; and
in response to determining that the second metadata indicates that at least one file of the data protection location is infected, determining not to perform the full restoration from the data protection location.

7. The system of claim 6, wherein the operations further comprise:
in response to performing the determining that the second metadata indicates that the at least one file of the data protection location is infected, deleting the data protection location.

8. The system of claim 6, wherein the operations further comprise:
in response to performing the determining that the second metadata indicates that the at least one file of the data protection location is infected, sending a notification to a user account associated with the data protection location.

9. A method, comprising:
in response to creating a data protection location for a first file, storing, by a system comprising a processor, an identifier of the data protection location in first metadata for the first file that identifies data protection locations of the first file;
determining, by the system, that the first file is infected with a virus;
in response to the determining, identifying, by the system, the data protection location from the first metadata for the first file; and
in response to the identifying, storing, by the system, an indication that the first file is infected in second metadata of the data protection location, wherein the data protection location comprises a data protection of multiple files, and wherein the indication identifies the first file within the data protection location.

10. The method of claim 9, further comprising:
receiving, by the system a request for partial restoration from the data protection location; and
in response to determining that the second metadata indicates that the data protection location lacks an infected file, performing, by the system, the partial restoration from the data protection location.

11. The method of claim 9, further comprising:
receiving, by the system, a request for partial restoration from the data protection location; and
in response to determining that the second metadata indicates that at least one file of the data protection location is infected, determining, by the system, not to perform the partial restoration from the data protection location, while preserving the data protection location in storage.

12. The method of claim 9, wherein the data protection location comprises a backup system, and wherein performing the storing of the indication that the first file is infected in the second metadata of the data protection location comprises:
sending, by the system, a request to the backup system via a communications network to store the indication that the first file is infected in the second metadata.

13. The method of claim 9, wherein the first file is stored on a first replication server and the data protection location is a second replication server, and further comprising:
in response to switching, by the system, from the first replication server to the second replication server as a live replication server, determining a copy of the first file on the second replication server has an infection based on the indication that the first file is infected in the second metadata; and
taking, by the system, a defined action to reduce the infection of the copy of the first file on the second replication server.

14. The method of claim 9, further comprising:
in response to performing the determining that the first file is infected with the virus, quarantining, deleting, or repairing, by the system, the first file.

15. A non-transitory computer-readable medium comprising instructions that, in response to execution, cause a system comprising a processor to perform operations, comprising:
determining that a first file is infected with a virus;
in response to the determining, identifying a data protection location from first metadata the first file, wherein the first metadata identifies data protection locations of the first file; and
in response to the identifying, storing an indication that the first file is infected in second metadata of the data protection location, wherein the data protection location comprises a data protection of multiple files, and wherein the indication identifies the first file within the data protection location.

16. The non-transitory computer-readable medium of claim 15, wherein the operations further comprise:
receiving a request to copy a second file as a third file;
determining that a most recent previous modification of the second file occurred after a time that the second file was last scanned for the virus; and
storing an identifier of the third file in third metadata for the second file that identifies unscanned copies of the second file.

17. The non-transitory computer-readable medium of claim 16, wherein the operations further comprise:
determining that the second file is infected with an infection;
taking a defined action to reduce the infection in the second file; and based on the identifier of the third file existing in the third metadata for the second file, taking the defined action to reduce the infection in the third file.

18. The non-transitory computer-readable medium of claim 17, wherein the operations further comprise:
    determining that fourth metadata for the third file identifies that a copy of the third file has been made as a fourth file, and that the fourth file is unscanned; and
    based on the fourth metadata, taking the defined action to reduce the infection in the fourth file.

19. The non-transitory computer-readable medium of claim 16, wherein the operations further comprise:
    in response to determining that the second file is uninfected, storing a first indication that the second file is uninfected;
    based on the identifier of the third file being determined to be represented in the third metadata for the second file, storing a second indication that the third file is uninfected; and
    removing the identifier of the third file the third metadata.

20. The non-transitory computer-readable medium of claim 16, wherein the operations further comprise:
    in response to modifying the second file, removing the identifier of the third file in the third metadata.

* * * * *